United States Patent
Aoki et al.

(10) Patent No.: US 8,345,363 B2
(45) Date of Patent: Jan. 1, 2013

(54) DRIVE DEVICE, LENS PART, AND CAMERA MODULE

(75) Inventors: Susumu Aoki, Ibaraki (JP); Hitoshi Kawamura, Ibaraki (JP); Takashi Hasuda, Ibaraki (JP); Eiji Takahashi, Ibaraki (JP); Ikuo Shinta, Ibaraki (JP)

(73) Assignee: Hitachi Maxell, Ltd., Osaka (JP)

( * ) Notice: Subject to any disclaimer, the term of this patent is extended or adjusted under 35 U.S.C. 154(b) by 0 days.

(21) Appl. No.: 13/002,235

(22) PCT Filed: Feb. 26, 2010

(86) PCT No.: PCT/JP2010/001346
§ 371 (c)(1),
(2), (4) Date: Sep. 9, 2011

(87) PCT Pub. No.: WO2010/098138
PCT Pub. Date: Sep. 2, 2010

(65) Prior Publication Data
US 2011/0317287 A1  Dec. 29, 2011

(30) Foreign Application Priority Data

Feb. 27, 2009 (JP) .................. 2009-047056
Feb. 27, 2009 (JP) .................. 2009-047057
Mar. 9, 2009 (JP) .................. 2009-054523
May 22, 2009 (JP) .................. 2009-124295

(51) Int. Cl.
*G02B 7/02* (2006.01)
*H01L 41/00* (2006.01)

(52) U.S. Cl. ........ 359/824; 359/813; 359/814; 359/823; 359/694; 310/311; 310/316.01; 310/328; 348/360

(58) Field of Classification Search .................. 359/813, 359/814, 822–824, 694–701; 310/316.01, 310/323.02, 323.16, 328; 348/207.99, 360, 348/374; 396/72, 85, 133; 74/25
See application file for complete search history.

(56) References Cited

U.S. PATENT DOCUMENTS 5,589,723 A * 12/1996 Yoshida et al. ............... 310/328
5,644,440 A * 7/1997 Akada ............................ 359/823
5,812,330 A * 9/1998 Akada ............................ 359/823
(Continued)

FOREIGN PATENT DOCUMENTS
JP       A 8-070586       3/1996
(Continued)

OTHER PUBLICATIONS

Office Action issued in Japanese Application 2009-054523, mailed Nov. 24, 2010. (with English-language translation).
(Continued)

*Primary Examiner* — Loha Ben
(74) *Attorney, Agent, or Firm* — Oliff & Berridge, PLC

(57) ABSTRACT

A drive device capable of engaging a drive shaft and a part holding the drive shaft with a suitable force without accompanying increase in the size of the drive device. The drive device includes a couple member with a piezoelectric element and a transmission shaft coupled together, a lens holder that holds a lens and to which the couple member is secured, a biasing member that biases the transmission shaft in a direction intersecting a placement direction of the transmission shaft viewed from the lens holder (excluding a lengthwise direction of the transmission shaft), and a link member (link body) that holds the transmission shaft in a slidable manner together with the biasing member.

19 Claims, 28 Drawing Sheets

U.S. PATENT DOCUMENTS

| | | | | |
|---|---|---|---|---|
| 6,111,336 A | * | 8/2000 | Yoshida et al. | 310/328 |
| 6,114,799 A | * | 9/2000 | Yoshida et al. | 310/328 |
| 7,595,947 B2 | * | 9/2009 | Lee et al. | 359/824 |
| 7,706,089 B2 | * | 4/2010 | Koc et al. | 359/824 |
| 7,764,449 B2 | * | 7/2010 | Koc et al. | 359/824 |
| 7,826,734 B2 | * | 11/2010 | Shirono et al. | 396/85 |
| 2007/0229702 A1 | * | 10/2007 | Shirono et al. | 348/374 |
| 2011/0006640 A1 | * | 1/2011 | Haussecker et al. | 310/323.16 |
| 2011/0242403 A1 | * | 10/2011 | Kawamura et al. | 348/360 |

FOREIGN PATENT DOCUMENTS

| | | |
|---|---|---|
| JP | A 2001-268951 | 9/2001 |
| JP | A 2006-091210 | 4/2006 |
| JP | A 2006-158144 | 6/2006 |
| JP | A 2006-178490 | 7/2006 |
| JP | A 2006-311788 | 11/2006 |
| JP | A 2008-289347 | 11/2008 |
| JP | A 2004-025407 | 2/2009 |
| JP | A 2009-027782 | 2/2009 |
| JP | A 2009-124857 | 6/2009 |

OTHER PUBLICATIONS

International Search Report issued in PCT/JP2010/001346, mailed Jun. 1, 2010. (with English-language translation).

* cited by examiner

|  | FIRST STATE | SECOND STATE | THIRD STATE | FOURTH STATE |
|---|---|---|---|---|
| SW1 | ON | OFF | OFF | OFF |
| SW2 | OFF | ON | OFF | OFF |
| SW3 | OFF | OFF | ON | OFF |
| SW4 | OFF | OFF | OFF | ON |

Fig. 23

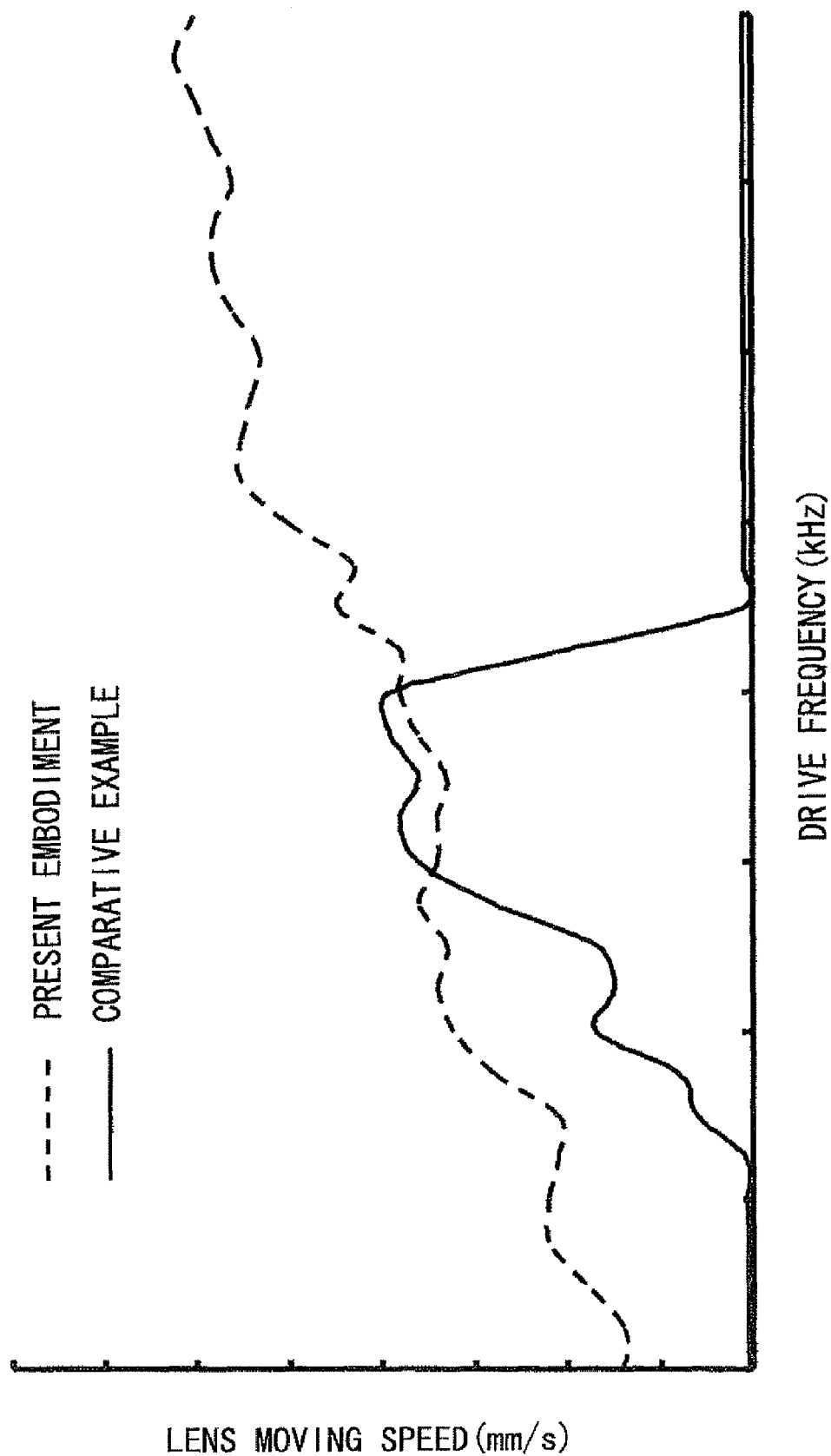

DRIVE DEVICE, LENS PART, AND CAMERA MODULE

TECHNICAL FIELD

The present invention relates to a drive device, a lens component, and a camera module.

BACKGROUND ART

Imaging devices such as cameras are incorporated into a wide variety of products today. When a camera is mounted on a small-sized electronic apparatus such as a cellular phone or a notebook computer, downsizing of the camera itself is strongly demanded.

An autofocus lens is incorporated into a camera in some cases. In such a case, downsizing of an actuator that displaces the lens is strongly demanded. As a small-sized actuator, an actuator that displaces a movable object by driving a piezoelectric element is known (cf. Patent document 1). Patent document 1 discloses a system in which a leaf spring biases a piezo element so that the piezo element and a shaft member are engaged with each other. Patent document 2 discloses a technique that applies a drive voltage having a given relationship with respect to a resonance frequency of a piezoelectric element under specified conditions.

CITATION LIST

Patent Literature

PTL 1: Japanese Unexamined Patent Application Publication No. 2006-178490
PTL 2: Japanese Unexamined Patent Application Publication No. 2001-268951

SUMMARY OF INVENTION

Technical Problem

In the actuator utilizing a piezo element, it is necessary to hold a drive shaft coupled to the piezoelectric element in a slidable manner. In order to realize smooth displacement of a movable object, it is necessary to engage the drive shaft and a part holding the drive shaft with a suitable force. In this case also, the demand for downsizing of the actuator utilizing the piezo element needs to be satisfied. As is obvious from the above description, it is strongly demanded to engage the drive shaft and the part holding the drive shaft with a suitable force without accompanying increase in the size of the drive device.

Solution to Problem

A drive device according to the present invention includes a couple member having a piezoelectric element and a drive shaft coupled together, a movable object with the couple member secured thereto, a biasing member that biases the drive shaft in a direction substantially intersecting a placement direction of the drive shaft viewed from the movable object (excluding a lengthwise direction of the drive shaft), and a shaft holding part that holds the drive shaft in a slidable manner together with the biasing member.

A drive device according to the present invention includes a couple member having a piezoelectric element and a drive shaft coupled together, a movable object with the couple member secured thereto, a biasing member that biases the drive shaft in a direction substantially parallel to a center line connecting a center of the movable object and a center of the drive shaft when viewed from above, and a shaft holding part that holds the drive shaft in a slidable manner together with the biasing member.

It is preferred that the biasing member at least includes a first plate member and an elastic body in this order along a direction of increasing distance from the drive shaft.

It is preferred that the biasing member further includes a second plate member in a position more distant from the drive shaft than the elastic body is, and a width of the second plate member along a direction intersecting a lengthwise direction of the drive shaft is narrower than a width of the first plate member along the direction intersecting the lengthwise direction of the drive shaft.

It is preferred that the shaft holding part at least partly houses the biasing member.

It is preferred that an angle between the placement direction of the drive shaft viewed from the movable object and a biasing direction of the drive shaft by the biasing member is in a range of 45 to 135 degrees.

It is preferred that the placement direction of the drive shaft viewed from the movable object and a biasing direction of the drive shaft by the biasing member are in substantially orthogonal relationship to each other.

It is preferred that an angle between the center line and a biasing direction of the drive shaft by the biasing member when viewed from above is in a range of 170 to 190 degrees.

It is preferred that an angle between the center line and a biasing direction of the drive shaft by the biasing member when viewed from above is in a range of 175 to 185 degrees.

It is preferred that the drive device further includes an surrounding member that at least partly surrounds the movable object, and the shaft holding part is placed between the movable object and the surrounding member.

It is preferred that a shape of the surrounding member when viewed from above is a polygonal shape, and the shaft holding part is placed at a corner of the surrounding member.

It is preferred that a shape of the surrounding member when viewed from above is a rectangular shape being a substantially square shape.

It is preferred that a width of the shaft holding part along a direction intersecting the center line when viewed from above becomes narrower toward a corner of the surrounding member.

It is preferred that the shaft holding part has a shape along a peripheral surface of the movable object.

It is preferred that the envelop includes a guide shaft placed parallel to the drive shaft in a position opposed to the shaft holding part, and the movable object includes an engagement part that is engaged with the guide shaft.

It is preferred that the shaft holding part is integral with the surrounding member.

It is preferred that the shaft holding part is a different part from the surrounding member.

It is preferred that the shaft holding part, together with the first plate member, holds the drive shaft, abutting against the periphery of the drive shaft at a plurality of points.

It is preferred that the shaft holding part is a metal molded member.

It is preferred that the shaft holding part contains aluminum alloy or zinc alloy.

It is preferred that the first plate member and the shaft holding part are engaged with each other by structural fitting.

It is preferred that the movable object is a lens holder that holds a lens, and a center of the movable object corresponds to an optical axis of the lens.

A lens component according to the present invention includes a couple member having a piezoelectric element and a drive shaft coupled together, a lens holder that holds a lens and to which the couple member is secured, a biasing member that biases the drive shaft in a direction intersecting a placement direction of the drive shaft viewed from the lens holder (excluding a lengthwise direction of the drive shaft), and a shaft holding part that holds the drive shaft in a slidable manner together with the biasing member.

A lens component according to the present invention includes a couple member having a piezoelectric element and a drive shaft coupled together, a lens holder that holds a lens and to which the couple member is secured, a biasing member that biases the drive shaft in a direction substantially parallel to a center line connecting a center of the movable object and a center of the drive shaft when viewed from above, and a shaft holding part that holds the drive shaft in a slidable manner together with the biasing member.

A camera module according to the present invention includes a couple member having a piezoelectric element and a drive shaft coupled together, a lens holder that holds a lens and to which the couple member is secured, a biasing member that biases the drive shaft in a direction intersecting a placement direction of the drive shaft viewed from the lens holder (excluding a lengthwise direction of the drive shaft), a shaft holding part that holds the drive shaft in a slidable manner together with the biasing member, and an image pickup means that takes an image input through the lens.

A camera module according to the present invention includes a couple member having a piezoelectric element and a drive shaft coupled together, a lens holder that holds a lens and to which the couple member is secured, a biasing member that biases the drive shaft in a direction substantially parallel to a center line connecting a center of the movable object and a center of the drive shaft when viewed from above, a shaft holding part that holds the drive shaft in a slidable manner together with the biasing member, and an image pickup means that takes an image input through the lens.

An electronic apparatus according to the present invention includes the above-described camera module.

Note that the above issue may be addressed by the following means.

A drive device according to the present invention includes a couple member having a piezoelectric element and a drive shaft coupled together, a stationary member that is engaged with the drive shaft directly or indirectly in a slidable manner along a lengthwise direction of the drive shaft, and a drive voltage generation circuit that generates a drive voltage applied to the piezoelectric element based on a pulse signal with a duty ratio of 10% or below. The drive voltage is generated based on the pulse signal with a duty ratio of 10% or below, and it is applied to the piezoelectric element. By narrowing the pulse width of the pulse contained in the pulse signal, the piezoelectric element is expanded or contracted in a short period of time. This enables efficient displacement of the movable object. This also enables enlargement of the frequency band of the pulse signal. Note that the movable object is preferably secured relative to the couple member.

It is preferred that the drive voltage generation circuit includes a pulse signal generation circuit that generates the pulse signal and a plurality of switching elements in an operational state determined according to output of the pulse signal generation circuit.

It is preferred that the pulse signal generation circuit generates a plurality of pulse signals in inverse relationship to each other.

It is preferred that the plurality of switching elements operate in a complementary fashion according to the corresponding pulse signals.

It is preferred to further include a movable object that is displaced together with the couple member relative to the stationary member according to drive of the piezoelectric element.

A camera module according to the present invention includes the above-described drive device, a lens directly or indirectly attached to the couple member, and an image pickup device that takes an image input through the lens.

A lens component according to the present invention includes the above-described drive device and a lens directly or indirectly attached to the couple member.

A control method of a drive device according to the present invention is a control method of a drive device including a couple member having a piezoelectric element and a drive shaft coupled together, and a stationary member that is engaged with the drive shaft directly or indirectly in a slidable manner along a lengthwise direction of the drive shaft, which includes generating a drive voltage based on a pulse signal with a duty ratio of 10% or below and applying the generated drive voltage to the piezoelectric element.

A drive device according to the present invention includes a piezoelectric element that expands and contracts according to a drive voltage generated based on a pulse signal with a duty ratio of 25% or below, a drive shaft to which the piezoelectric element is coupled directly or indirectly, a stationary member that is engaged with the drive shaft directly or indirectly in a slidable manner along a lengthwise direction of the drive shaft, and a movable object that is displaced together with the piezoelectric element and the drive shaft relative to the stationary member during a first period when a voltage value of the drive voltage varies between a first voltage level and a second voltage level in a relatively short time and not substantially displaced relative to the stationary member during a second period when the voltage value of the drive voltage varies between the first voltage level and the second voltage level over a relatively long time.

Further, the above issue may be addressed by the following means.

A lens drive device according to the present invention includes a couple member having a piezoelectric element and a drive shaft coupled together, a stationary member that is engaged with the drive shaft directly or indirectly in a slidable manner along a lengthwise direction of the drive shaft, and a driven member that is displaced together with the couple member relative to the stationary member according to application of a drive voltage to the piezoelectric element, wherein the driven member is displaced relative to the stationary member during a first period when a voltage value of the drive voltage varies between a first voltage level and a second voltage level in a relatively short time and not substantially displaced relative to the stationary member during a second period when the voltage value of the drive voltage varies between the first voltage level and the second voltage level over a relatively long time. A drive device of a new type different from existing types can be provided.

It is preferred that the stationary member is an surrounding member that at least partly surrounds the driven member. It is preferred that the driven member and the surrounding member are coupled to each other at least through an engagement part that is slidably engaged with the drive shaft.

It is preferred that the drive voltage is generated based on a pulse signal with a duty ratio of 10% or below. It is preferred that the driven member is a lens holder.

A camera module according to the present invention includes the above-described drive device, and an image pickup device that takes an image input through the lens held by the lens holder.

A drive device according to the present invention includes a couple member having a piezoelectric element and a drive shaft coupled together, a stationary member that is engaged with the drive shaft directly or indirectly in a slidable manner along a lengthwise direction of the drive shaft, and a driven member that is displaced together with the couple member relative to the stationary member according to application of a drive voltage to the piezoelectric element, wherein the driven member is displaced relative to the stationary member when the piezoelectric element is expanded or contracted in a relatively short time and not substantially displaced relative to the stationary member when the piezoelectric element is expanded or contracted over a relatively long time.

A control method of a drive device according to the present invention is a control method of a drive device including a couple member having a piezoelectric element and a drive shaft coupled together, a stationary member that is engaged with the drive shaft directly or indirectly in a slidable manner along a lengthwise direction of the drive shaft, and a driven member that is displaced together with the couple member relative to the stationary member according to application of a drive voltage to the piezoelectric element, which includes displacing the driven member relative to the stationary member by varying a voltage value of the drive voltage between a first voltage level and a second voltage level in a relatively short time and not substantially displacing the driven member relative to the stationary member by varying the voltage value of the drive voltage between the first voltage level and the second voltage level over a relatively long time.

Advantageous Effects of Invention

According to the present invention, it is possible to engage the drive shaft and the part holding the drive shaft with a suitable force without accompanying increase in the size of the drive device.

BRIEF DESCRIPTION OF DRAWINGS

FIG. 23 is a table to explain an operation of the drive voltage generation circuit according to the first embodiment of the present invention;

FIG. 30 is a schematic view showing a lens moving characteristics with respect to each type of an actuator.

DESCRIPTION OF EMBODIMENTS

Embodiments of the present invention will be described hereinafter with reference to the drawings. Each embodiment is simplified for convenience of description. The drawings are given in simplified form by way of illustration only, and thus are not to be considered as limiting the present invention. The drawings are given merely for the purpose of explanation of technological matters, and they do not show the accurate scale or the like of each element shown therein. The same elements are denoted by the same reference symbols, and the redundant explanation is omitted. The terms indicating the directions, such as up, down, left and right, are used on condition that each drawing is viewed from the front.

First Embodiment

Figure 1:
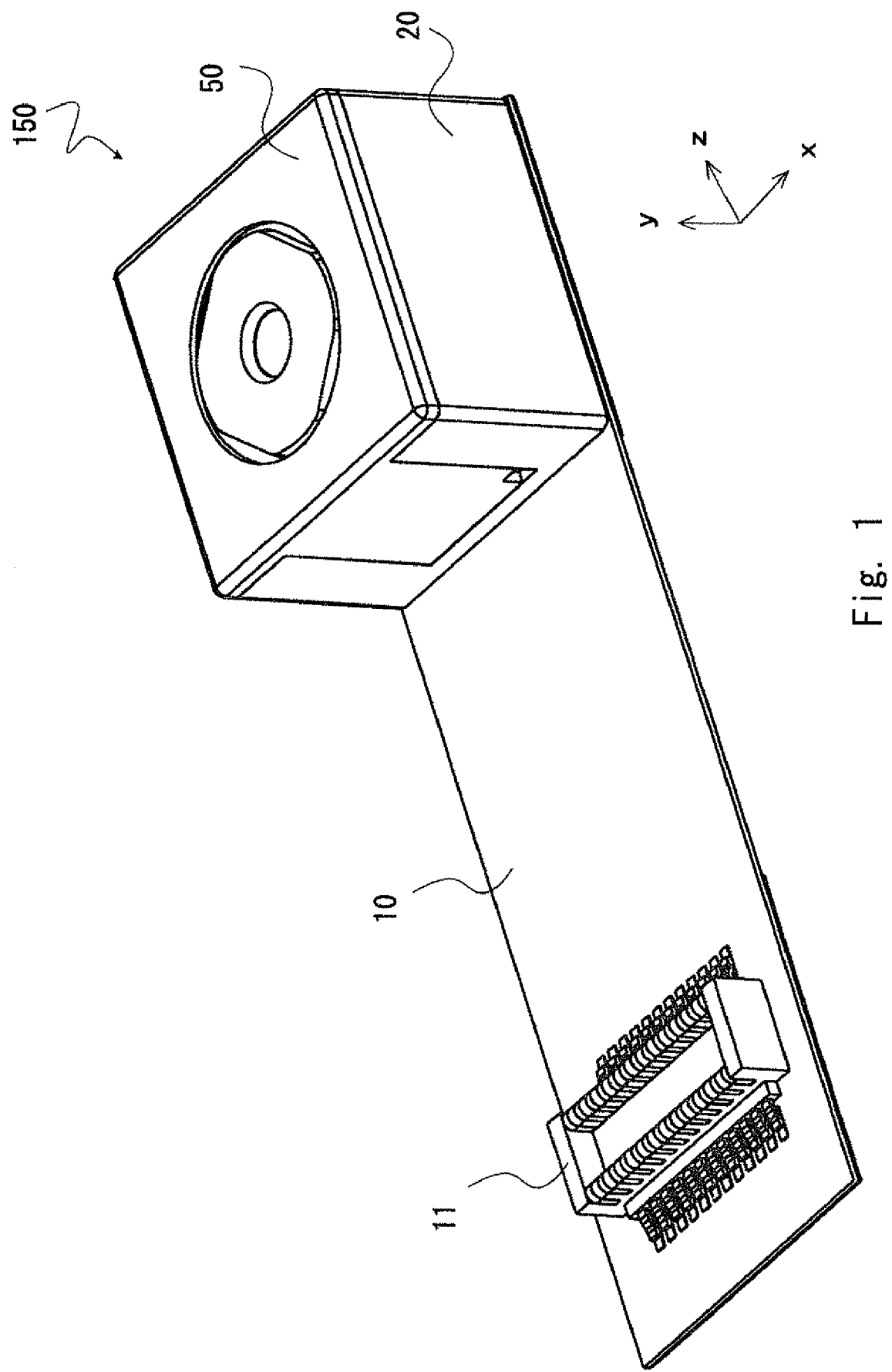
FIG. 1 is a schematic perspective view of a camera module according to a first embodiment of the present invention.
Figure 2:
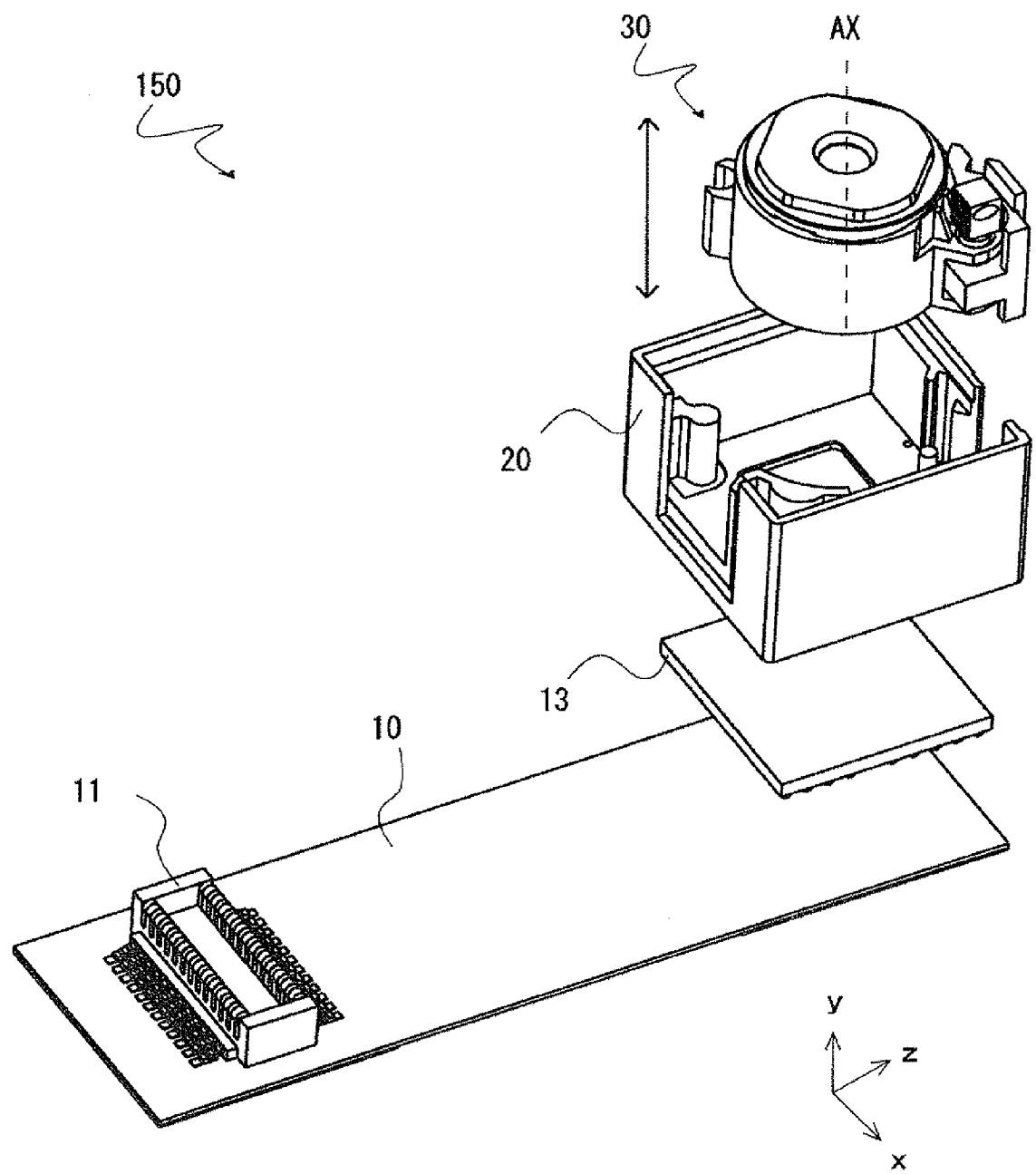
FIG. 2 is a schematic partial exploded perspective view of the camera module according to the first embodiment of the present invention.
Figure 3:
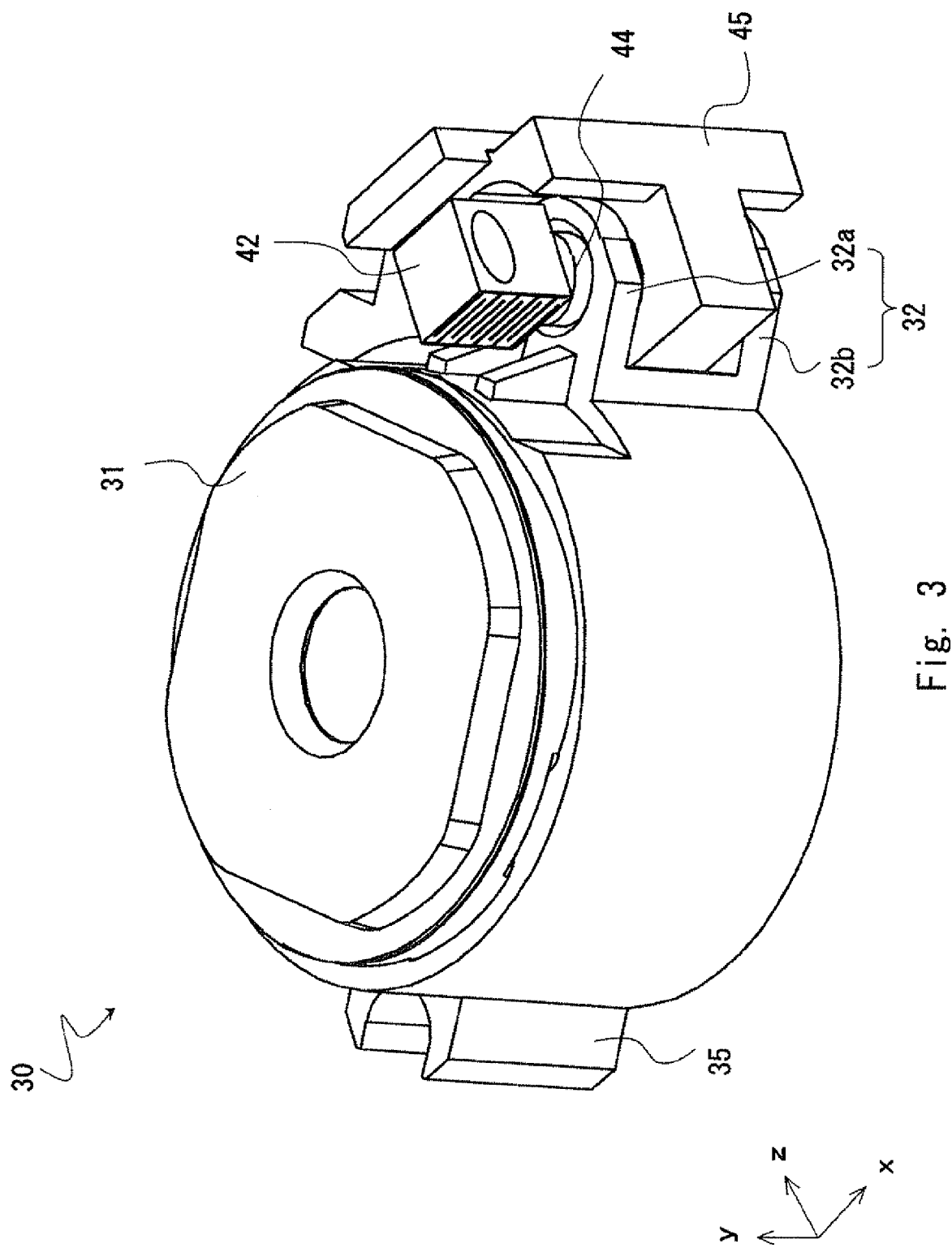
FIG. 3 is a schematic perspective view of a lens unit according to the first embodiment of the present invention.
Figure 4:
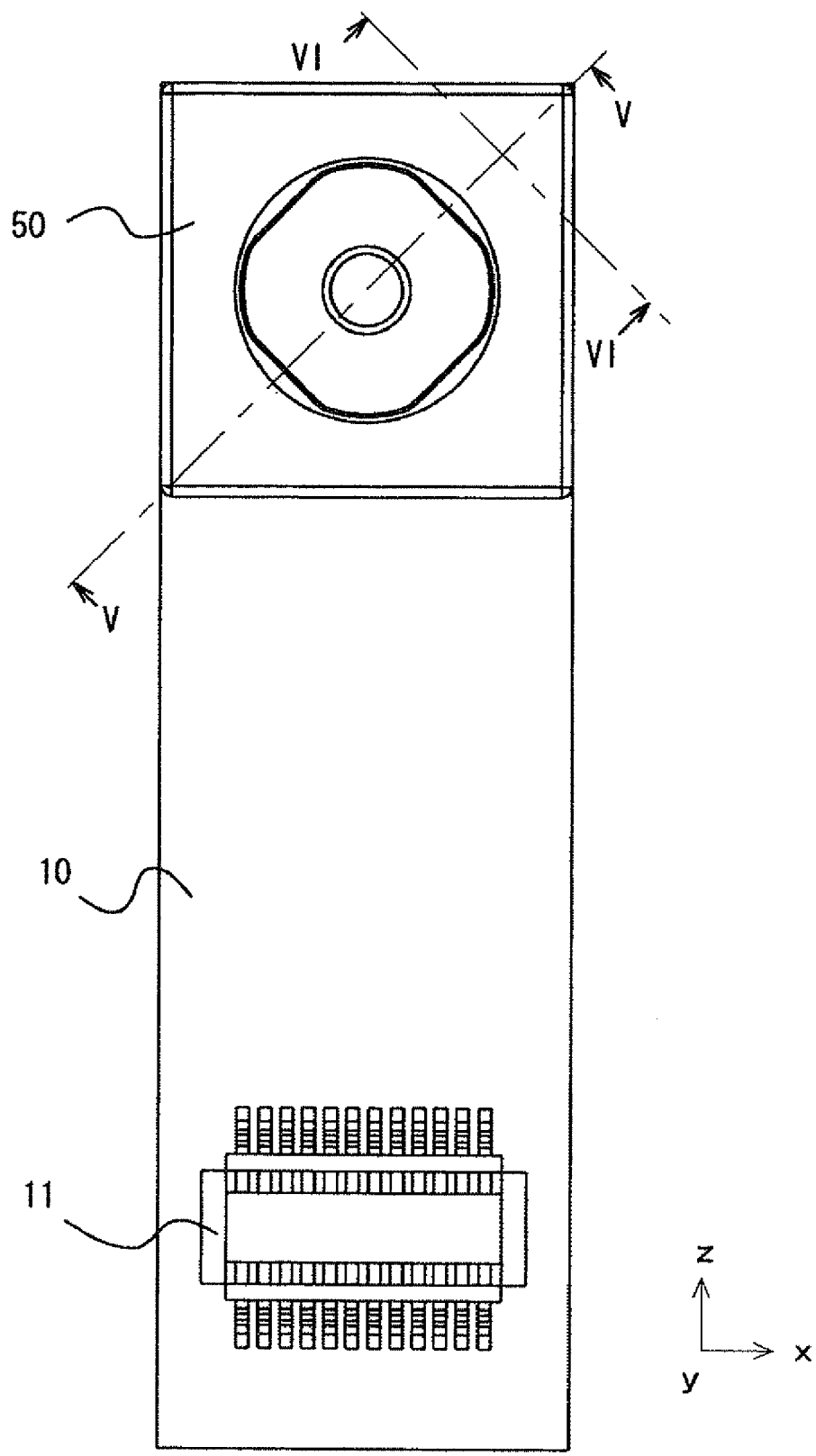
FIG. 4 is a schematic top view of the camera module according to a first embodiment of the present invention.
Figure 5:
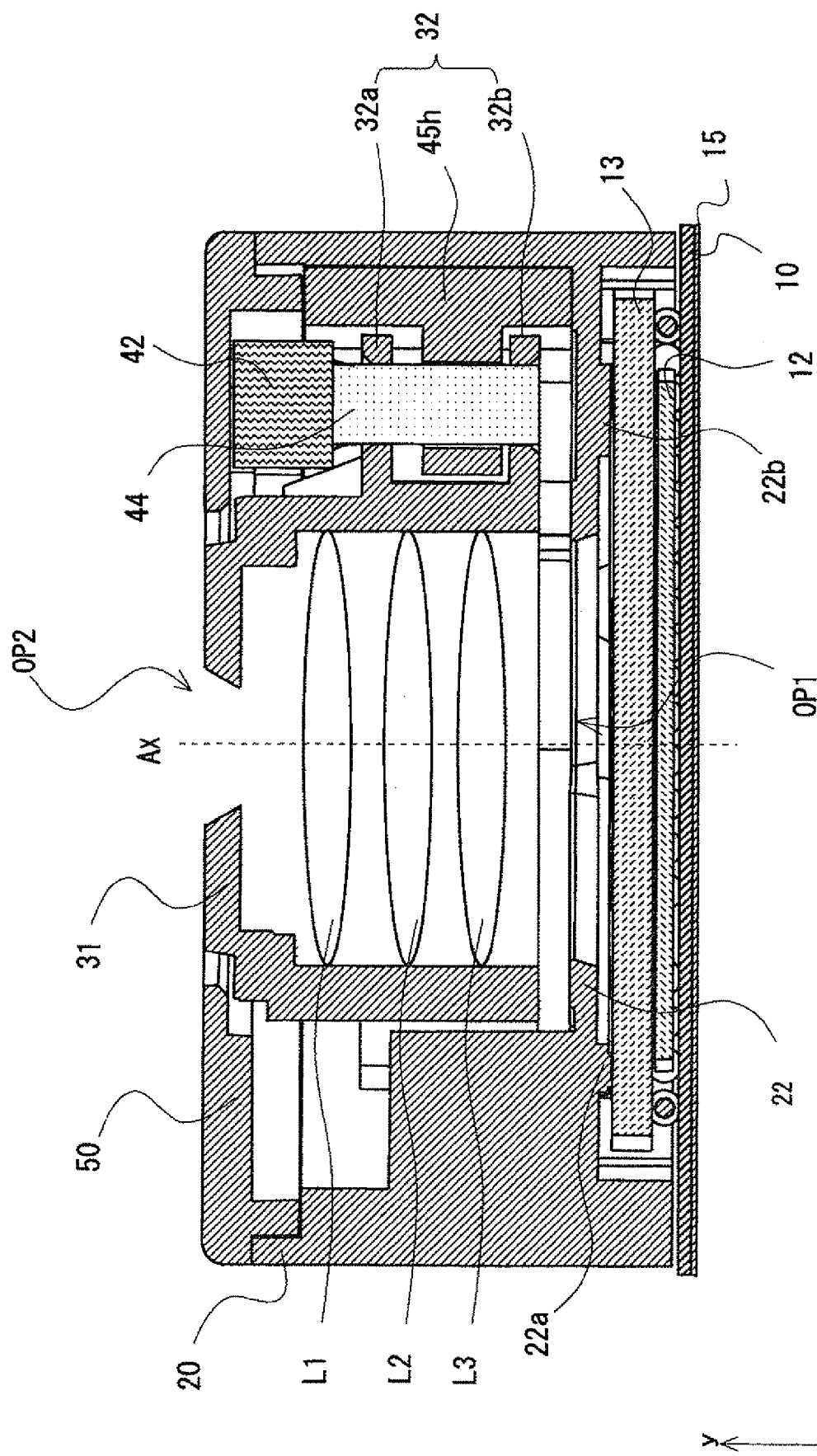
FIG. 5 is a schematic sectional view of the camera module according to a first embodiment of the present invention.
Figure 6:
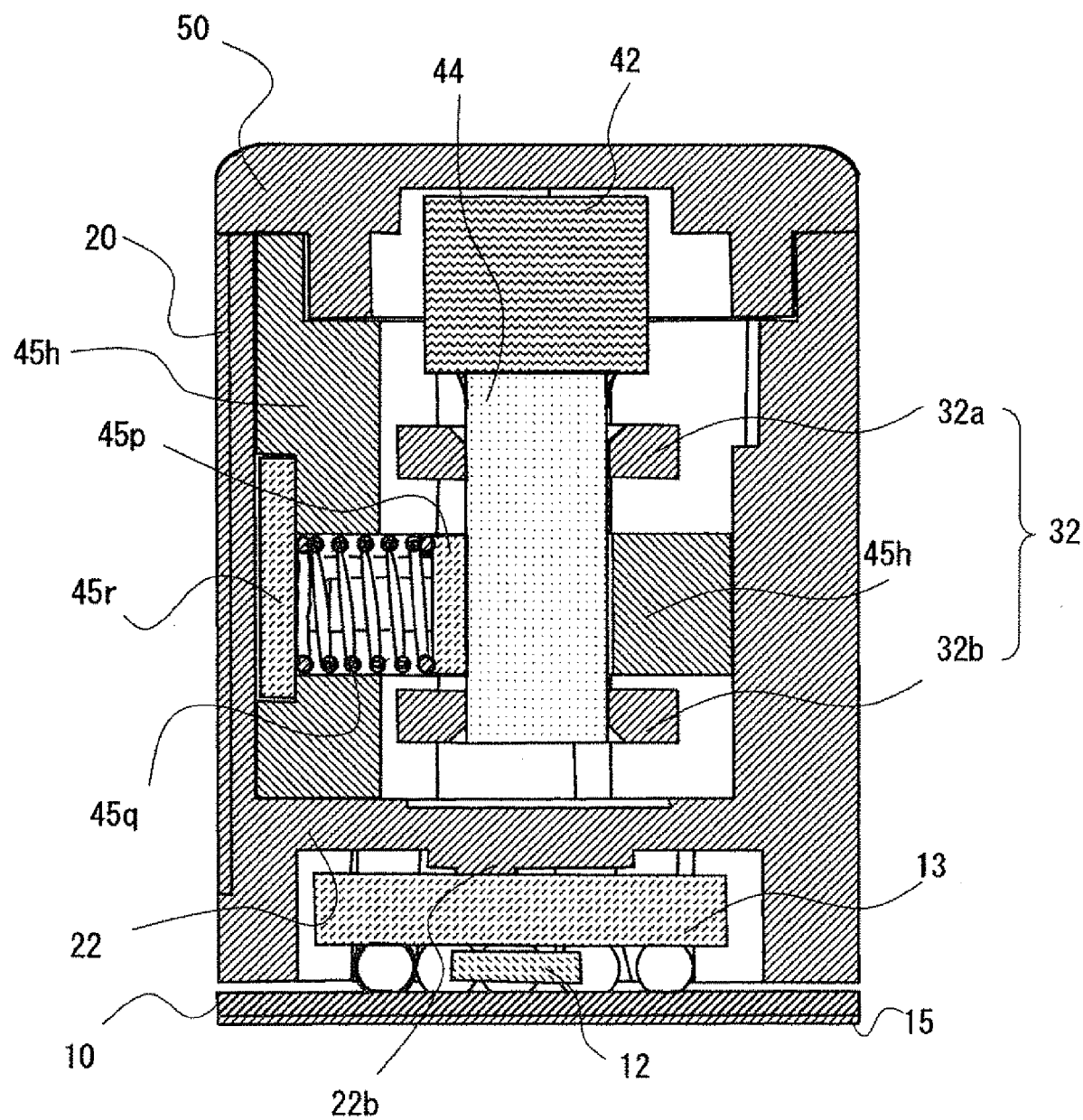
FIG. 6 is a schematic sectional view of the camera module according to a first embodiment of the present invention.

A first embodiment of the present invention will be described hereinafter with reference to the drawings. First, description will be given with reference to FIGS. 1 to 6. FIGS. 1 and 2 show perspective views of a camera module 150. FIG. 3 shows a perspective view of a lens unit 30. FIG. 4 shows a top view of the camera module 150. FIG. 5 shows a schematic sectional view along line V-V in FIG. 4. FIG. 6 shows a schematic sectional view along line VI-VI in FIG. 4.

As shown in FIGS. 1 to 3, the camera module (camera component) 150 includes a wiring board 10, a connector 11, a transparent substrate 13, a casing (surrounding member) 20, a lens unit (lens component) 30, and a cover 50. As shown in FIGS. 5 and 6, the camera module 150 further includes an image pickup device (image pickup means) 12.

As shown in FIGS. 1 and 2, the connector 11 is disposed on one end of the wiring board 10. An imaging module in which the image pickup device 12 is attached onto the transparent substrate 13 is disposed on the other end of the wiring board 10. Above the image pickup device 12, the transparent substrate 13, the casing 20, the lens unit 30 and the cover 50 are arranged in this order. The casing 20 functions as a stationary member in the state of not moving (in the state of being fixed) when viewed from the lens unit 30 (or lenses L1 to L3 described later), which is a movable object.

The wiring board 10 is a sheet-like wiring board having flexibility. The wiring board 10 functions as a transmission path of a control signal input to the image pickup device 12 and a video signal output from the image pickup device 12. Further, the wiring board 10 functions as a transmission path of a drive voltage input to a piezo element 42.

The connector 11 forms a connecting part for electrically and mechanically fixing the camera module 150 to a main apparatus.

The image pickup device 12 is a general solid-state image pickup device such as a CCD (Charge Coupled Device) sensor or a CMOS (Complementary Metal Oxide Semiconductor) sensor. The image pickup device 12 has a plurality of pixels arranged in matrix on an x-z plane. By photoelectric conversion in each pixel, an input image is converted into image data and output.

The transparent substrate 13 is a plate-shaped member which is substantially transparent to input light. The transparent substrate 13 is square-shaped when viewed from above. The image pickup device 12 is bump-connected on the backside of the transparent substrate 13.

The casing 20 is disposed above the transparent substrate 13. The casing 20 houses the transparent substrate 13 in its lower space and houses the lens unit 30 in its upper space. The use of the casing 20 enables modularization of the camera function. In order to prevent extraneous light from entering the inside of the casing 20, the lower end surface of the casing 20 is fixed to the wiring board 10 by a black adhesive. The casing 20 is produced by molding of black resin, for example.

As shown in FIG. 3, the lens unit 30 includes a lens holder (holder) 31, a piezo element (piezoelectric element) 42, a transmission shaft (drive shaft) 44, and a link member (shaft holding part) 45. As shown in FIG. 5, the lens unit 30 further includes lenses L1 to L3.

The transmission shaft 44 is secured to the lens holder 31. The link member 45 is engaged with the transmission shaft 44 in the state of being slidable along the y-axis. In other words, the link member 45 is in friction engagement with the transmission shaft 44. The lens holder 31, the piezo element 42 and the transmission shaft 44 have the relative positional relationship fixed to one another. They can move relative to the link member 45.

The lens holder 31 houses the lenses L1 to L3 inside. The lens unit 30 is movable along the y-axis (the axis line coinciding with the optical axis of the lenses L1 to L3) according to drive of the piezo element 42 (excluding the link member 45). By adjusting the placement height of the lenses L1 to L3 relative to the imaging surface of the image pickup device 12, an object image can be formed on the imaging surface of the image pickup device 12 as intended. Note that the link member 45 may be regarded as a coupling member (coupling part) for coupling the lens holder 31 to the casing 20.

On the periphery of the lens holder 31, the transmission shaft 44 to which the piezo element 42 is fastened at one end and the link member 45 which is frictionally engaged with the transmission shaft 44 are disposed. Note that the piezo element 42 and the transmission shaft 44 are coupled to each other by adhesion using a soft-curing adhesive. However, they may be coupled to each other by fitting.

On the peripheral surface of the lens holder 31, two support plates 32a and 32b arranged in the y-axis direction with a certain space therebetween are formed. The support plates 32a and 32b are extending parts that extend outside of the lens holder 31. Although the support plates 32a and 32b are preferably integral with the lens holder 31, they may be different parts from the lens holder 31.

The transmission shaft 44 is fit into holes of the support plates 32a and 32b, so that the transmission shaft 44 is secured relative to the lens holder 31.

The link member 45 engaged with the transmission shaft 44 is disposed between the support plates 32a and 32b. The respective members of the support plates 32a and 32b and the link member 45 have holes through which the transmission shaft 44 is inserted. In the state where the link member 45 is placed between the support plates 32a and 32b, the transmission shaft 44 is inserted to those members. The lens holder 31 and the link member 45 are thereby coupled through the transmission shaft 44.

By fixedly supporting the transmission shaft 44 by the support plates 32a and 32b with the link member 45 placed therebetween, the moving range of the lens holder 31 can be restricted. However, it is not limited to such two-point support, and the transmission shaft 44 may be supported only by the support plate 32a or the support plate 32b. Note that the top faces of the lens holder 31 and the piezo element 42 may be coupled through a support plate.

The support plate 32b fixedly supports the transmission shaft 44. The hole of the support plate 32b is slightly narrower than the diameter of the transmission shaft 44. By fitting the transmission shaft 44 into the hole of the support plate 32b by applying a pressure, the transmission shaft 44 can be fixed to the support plate 32b. The diameter of the hole of the support plate 32a is the same as that of the support plate 32b.

By employing the above structure, the transmission shaft 44 can be tightly held by the support plates 32a and 32b. In other words, a vibration transmission rate between the transmission shaft 44 and each of the support plates 32a and 32b increases. This enables efficient displacement of the lens holder 31.

In the case of employing a method different from the press fitting, the effect similar to that of the above-described case can be obtained by appropriately selecting adhesives. For example, it is preferred to use a thermosetting epoxy adhesive.

As described above, the lens holder 31 houses the lenses L1 to L3. The lenses L1 to L3 are press-fitted to the lens holder 31 and positioned relative to the lens holder 31 with predetermined accuracy. Note that the lenses may be fixed to the lens holder 31 by a method different from the press-fitting. A top plate of the lens holder 31 has an opening OP2. The top plate of the lens holder 31 functions optically as a diaphragm.

The piezo element 42 is a typical piezoelectric element in which ceramics layers (piezoelectric layers) are laminated. A pair of electrodes are formed on side surfaces of the piezo element 42. When, in the state where one electrode is grounded, a drive voltage is applied to the other electrode, for example, the piezo element 42 expands and contracts in the y-axis direction.

The transmission shaft 44 is fixed to the lower face of the piezo element 42. Specifically, the transmission shaft 44 is fixed to the piezo element 42 by an adhesive in the state where the upper end face of the transmission shaft 44 is placed on the lower face of the piezo element 42. Note that the transmission shaft 44 may be fixed to the piezo element 42 in a method different from the adhesive. For example, an attachment that has the same sectional shape as the piezo element and has a depressed portion to which the transmission shaft can fit at its upper part may be placed above the piezo element 42, and the transmission shaft 44 and the piezo element 42 may be connected with the attachment placed therebetween. Note that a method of coupling the piezo element 42 and the transmission shaft 44 is arbitrary. They may be coupled by abutting the piezo element 42 against the side face of the transmission shaft 44.

The transmission shaft 44 transmits vibration produced by the piezo element 42 to the link member 45. The link member 45 is coupled to the casing 20 and fixed in position. The transmission shaft 44 transmits the vibration produced by the piezo element 42 to the casing 20 through the link member 45. Because the link member 45 is fixed to the casing 20, the piezo element 42, the transmission shaft 44 and the lens holder 31 move relative to the link member 45 due to the vibration produced by the piezo element 42.

The transmission shaft 44 is preferably lightweight and highly rigid. The transmission shaft 44 is made of material with a relative density of 2.1 or less. Preferably, the transmission shaft 44 is made of material with a relative density of 2.1 or less and an elastic modulus of 20 GPa or more. More preferably, the transmission shaft 44 is made of material with a relative density of 2.1 or less and an elastic modulus of 30 GPa or more. It is thereby possible to shift the resonance frequency to the high frequency side and obtain a continuous available frequency band.

The transmission shaft 44 is preferably made of glass-like carbon, fiber-reinforced resin, or epoxy resin. Glass-like carbon complex containing graphite, fiber-reinforced resin or glass containing carbon, or epoxy resin composite containing carbon is particularly preferable.

The structure of the link member 45 is described later.

Further description will be given with reference to FIGS. 5 and 6. On the backside of the transparent substrate 13, a wiring pattern is formed in advance. A plurality of solder bumps (not shown) are disposed between the transparent substrate 13 and the image pickup device 12. Specifically, the image pickup device 12 is bump-mounted onto the transparent substrate 13. The image pickup device 12 is mechanically fixed to the transparent substrate 13 through the solder bumps and also electrically connected to the wiring of the transparent substrate 13 through the solder bumps. Note that the a light receiving surface of the image pickup device 12 is placed on the side of the transparent substrate 13.

A distance (spaced distance) between the image pickup device 12 and the transparent substrate 13 is determined by the size of the solder bumps. The positioning between the image pickup device 12 and the transparent substrate 13 can be made accurately by appropriately controlling the size of the solder bumps. Further, because the positioning is made by the plurality of solder bumps, the spaced distance between the image pickup device 12 and the transparent substrate 13 is balanced.

The transparent substrate 13 is bump-connected to the wiring board 10. Specifically, the transparent substrate 13 is fixed to and electrically connected to the wiring board 10 through solder bumps. Note that, by the solder bumps between the transparent substrate 13 and the wiring board 10, a space is made between the image pickup device 12 and the wiring board 10. In other words, the solder bumps between the transparent substrate 13 and the wiring board 10 function as a spacer for creating a space between the image pickup device 12 and the wiring board 10.

As shown in FIGS. 5 and 6, on the backside of a partition 22 which separates the upper space and the lower space of the casing 20, ribs (position restriction portions) 22a and 22b are formed. By these, when placing the casing 20 on the transparent substrate 13, it is possible to suitably hold down the transparent substrate 13 from above and suitably position the transparent substrate 13. Note that the placement position of the transparent substrate 13 may be restricted from the up direction directly by the casing 20, without forming the ribs 22a and 22b. The partition 22 has an opening OP1 for optically connecting the upper and lower spaces. The opening OP1 can be an opening in an optical sense.

In order to suitably position the transparent substrate 13, ribs (not shown) opposed to the side face of the transparent substrate 13 may be formed on the casing 20. By these, when placing the casing 20 on the transparent substrate 13, it is possible to suitably restrict the placement position of the transparent substrate 13 from the cross direction and thereby suitably position the transparent substrate 13. Note that the placement position of the transparent substrate 13 may be restricted from the cross direction directly by the casing 20, without forming such ribs.

As shown in FIGS. 5 and 6, a reinforcing plate 15 is disposed below the wiring board 10. The reinforcing plate 15 is made of resin material such as polyimide. The color of the reinforcing plate 15 is black. By placing the reinforcing plate 15, it is possible to suitably prevent extraneous light from entering the inside of the camera module 150. Further, in this example, the black wiring board 10 is employed in order to further prevent the adverse effect of extraneous light.

The cover 50 is attached to the casing 20. The lens unit 30 disposed in the upper space of the casing 20 can be thereby confined inside the casing 20.

Preferably, the cover 50 is attached to the casing 20 by a screw. Because the cover 50 is fixed to the casing 20 not by adhesion but by the screw, the cover 50 is detachable from the casing 20. This allows the cause of defect of the camera module 150 determined to be defective by an operating test to be removed after the test. For example, by eliminating a foreign particle sticking on the imaging surface of the image pickup device 12 after the operating test, the yield of the camera module can be improved. Note that the cover 50 is produced by molding of resin, for example.

Figure 7:
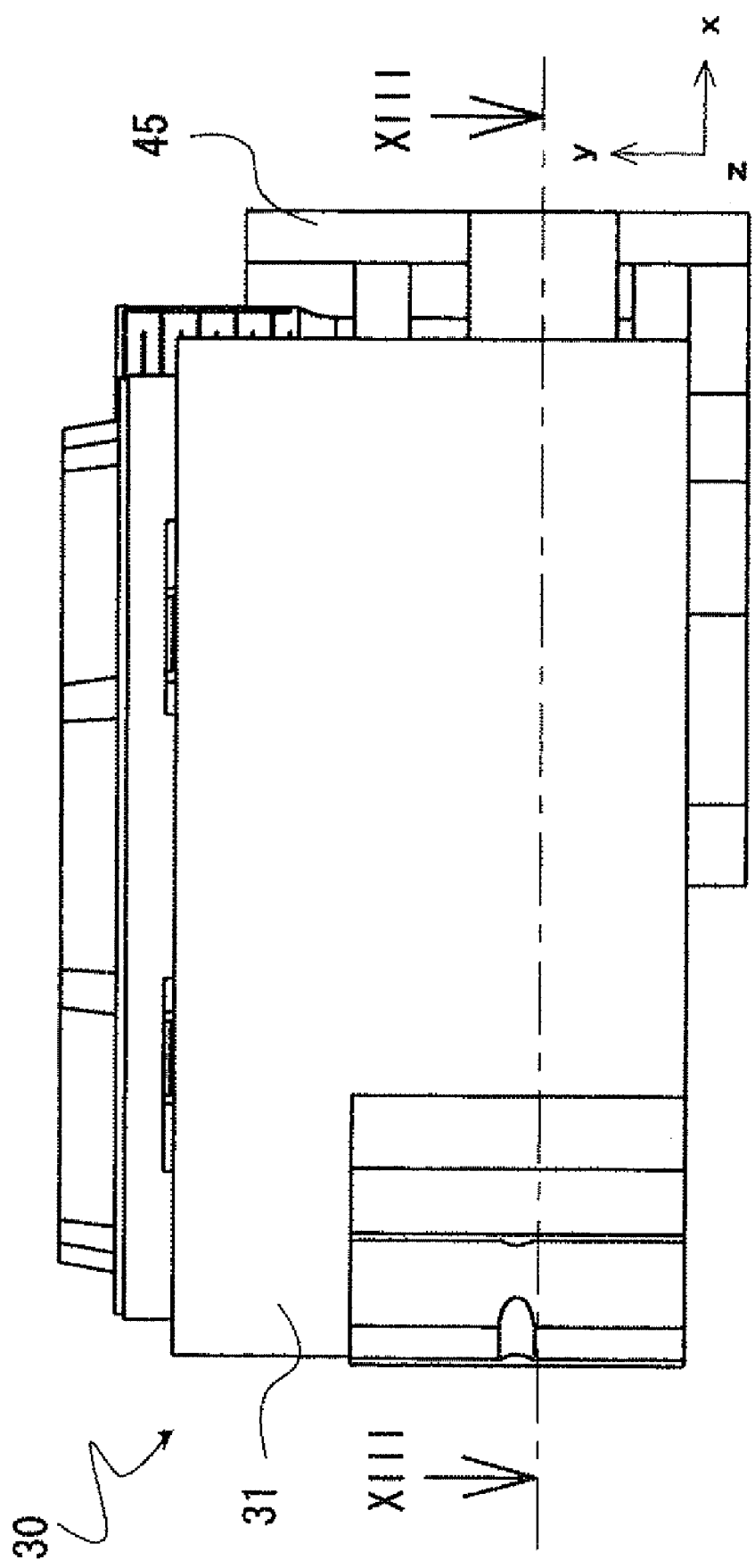
FIG. 7 is a schematic side view of the lens unit according to a first embodiment of the present invention.
Figure 8:
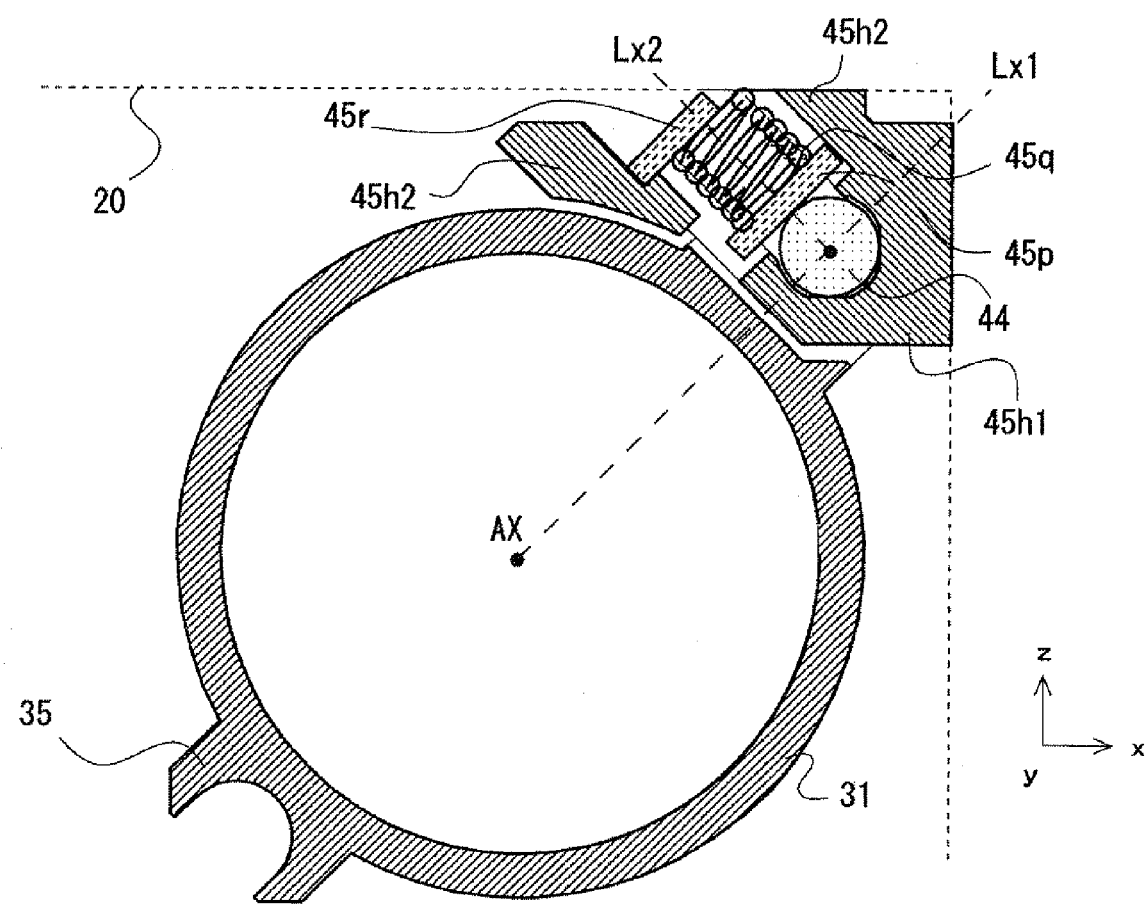
FIG. 8 is a schematic sectional view of the lens unit according to a first embodiment of the present invention.
Figure 9:
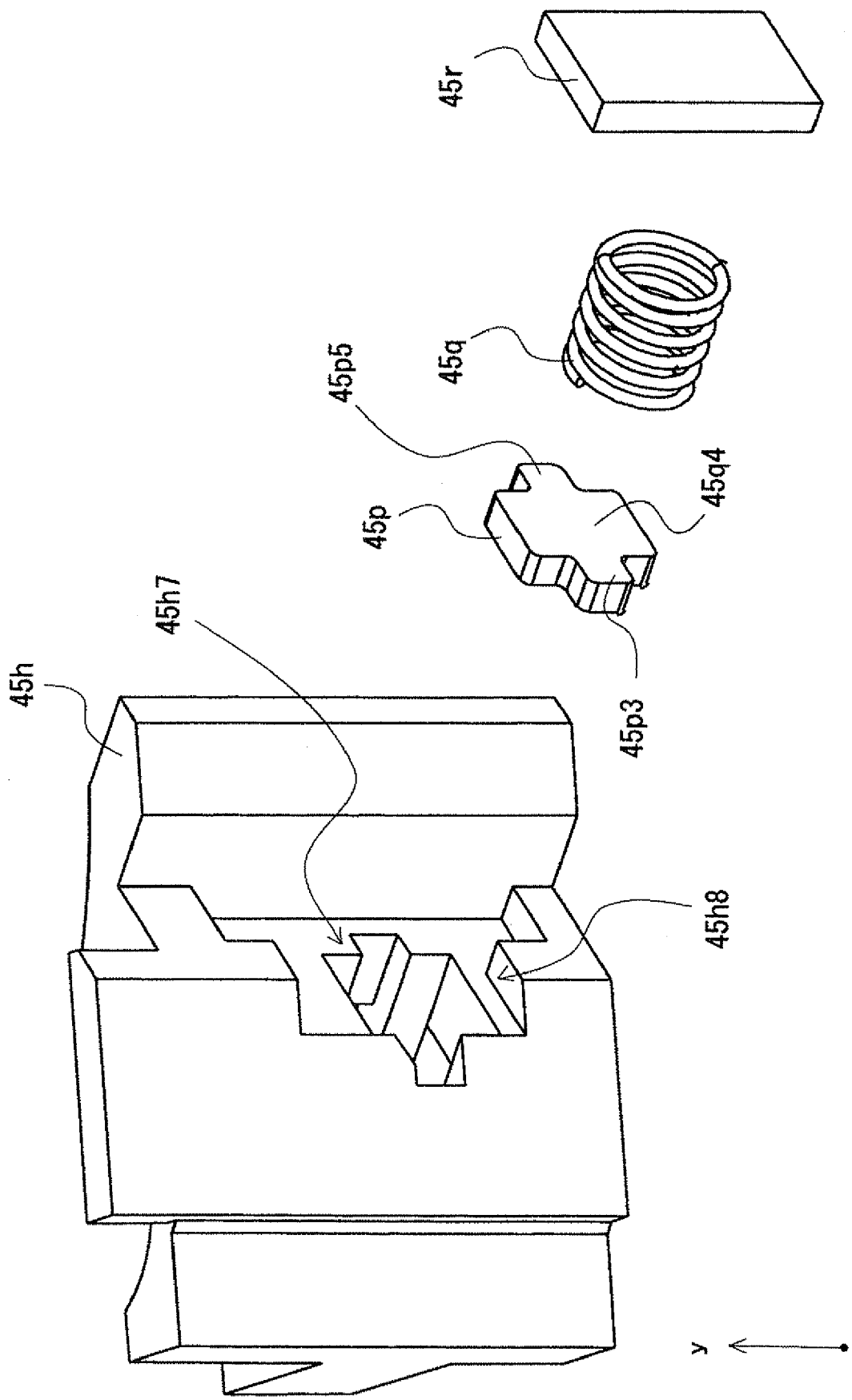
FIG. 9 is a schematic exploded perspective view of a link member according to the first embodiment of the present invention.
Figure 10:
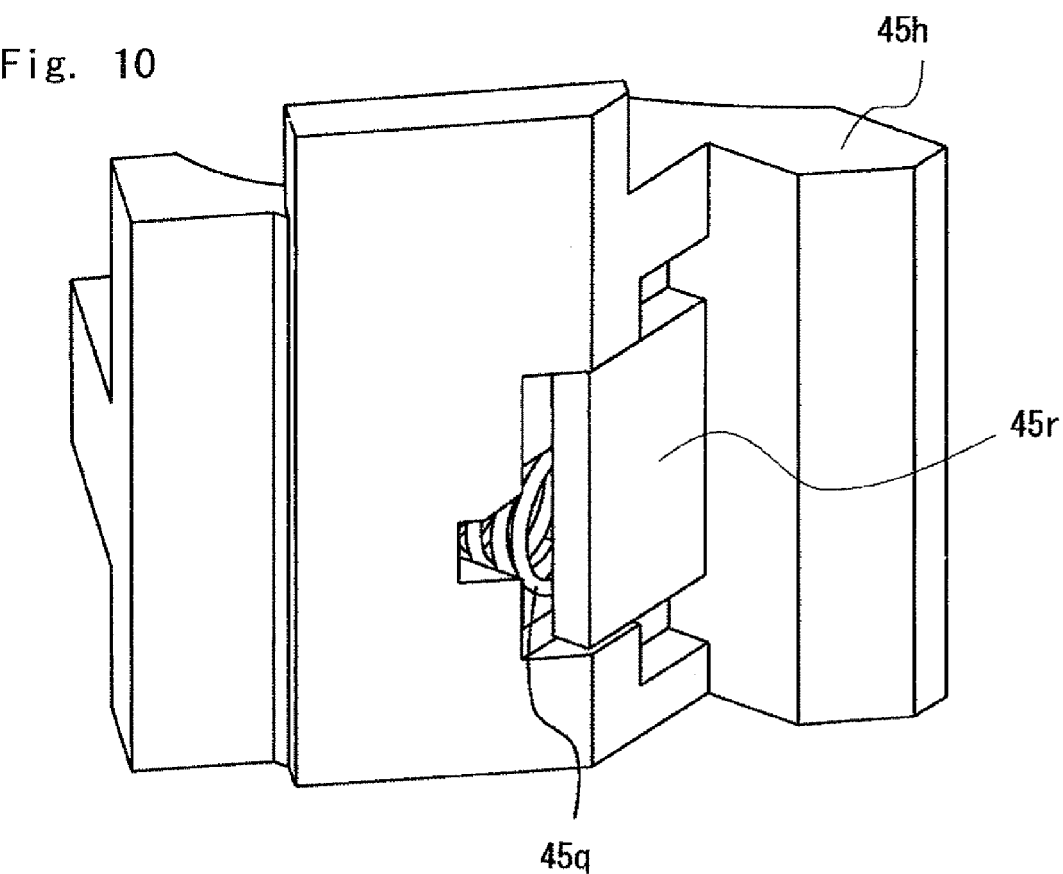
FIG. 10 is a schematic rear view of the link member according to the first embodiment of the present invention.
Figure 11:
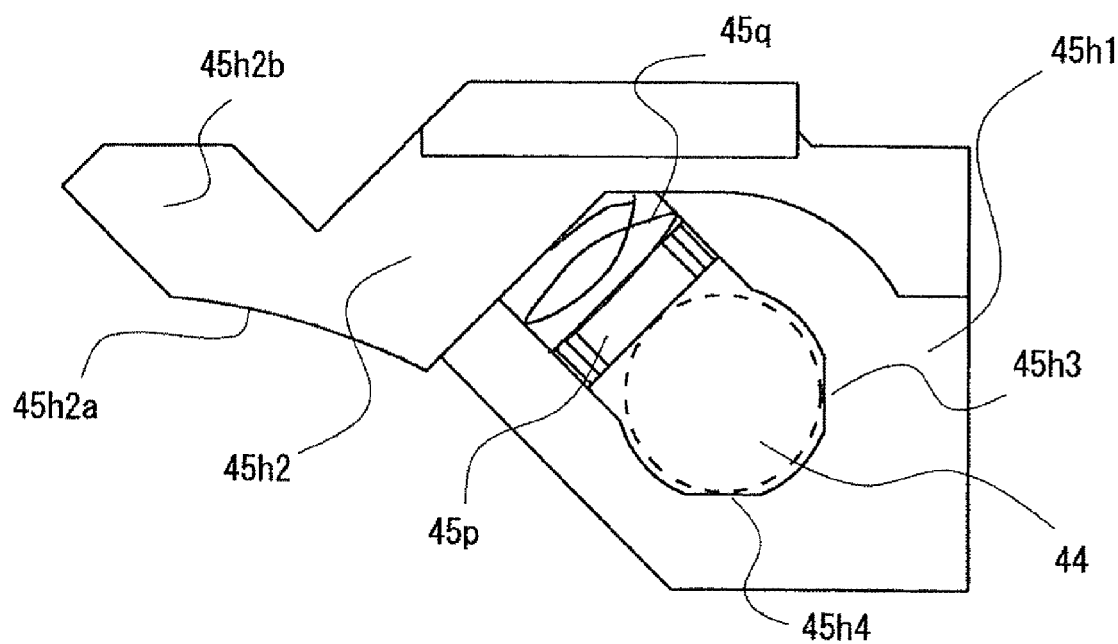
FIG. 11 is a schematic top view of the link member according to the first embodiment of the present invention.
Figure 12:
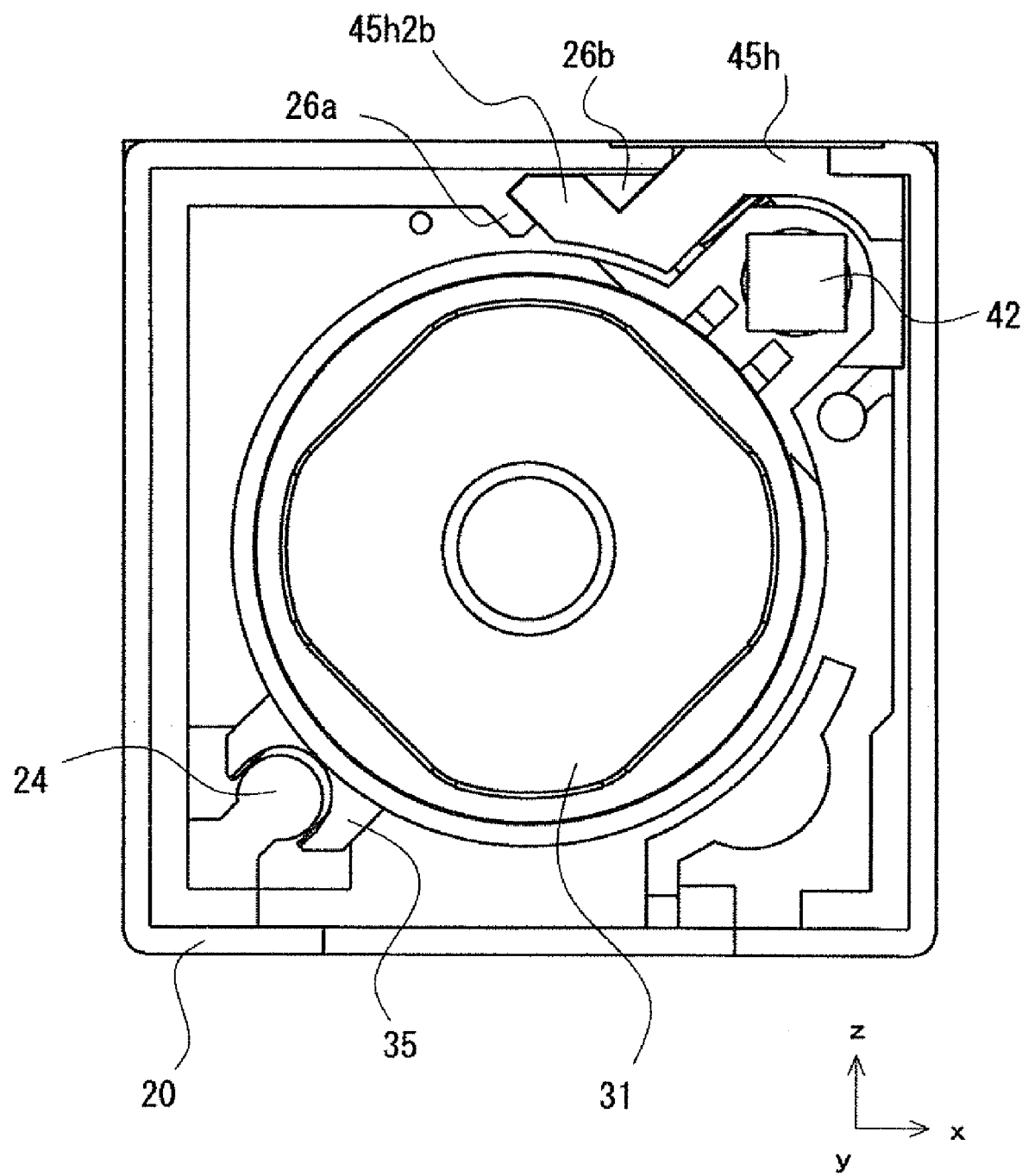
FIG. 12 is a schematic partial top view of the camera module according to the first embodiment of the present invention.

Further description will be given with reference to FIGS. 7 to 12. FIG. 7 shows a side view of the lens unit 30. FIG. 8 shows a schematic sectional view along line XIII-XIII in FIG. 8. FIG. 9 shows an exploded perspective view of the link member 45. FIG. 10 shows a rear view of the link member 45. FIG. 11 shows a top view of the link member 45. FIG. 12 schematically shows the way the link member 45 is attached to the casing 20.

As shown in FIGS. 8 to 11, the link member 45 includes a link body 45$h$, a press plate (first plate member) 45$p$, a spring (elastic body) 45$q$, and a press plate (second plate member) 45$r$. The press plate 45$p$, the spring 45$q$ and the press plate 45$r$ are arranged in this order in the direction of increasing distance from the transmission shaft 44. Note that a biasing member is composed at least of the spring 45$q$.

The spring 45$q$ is a typical coil spring. The diameter of the spring 45$q$ is substantially the same or slightly smaller than the diameter of the press plate 45$p$. A specific structure of the spring 45$q$ is arbitrary. An elastic body of another type (a leaf spring, resin-made rubber etc.) may be used. The link body 45$h$ is produced by molding resin with a die. For example, the press plates 45$p$ and 45$r$ are produced by press-molding a metal plate or a resin plate.

The width of the press plate 45$p$ along the axis line Lx1 is narrower than the width of the press plate 45$r$ along the axis line Lx1. This enables the spring 45$q$ to be placed in the position closer to the inner surface of the casing 20, thereby reducing the size of the camera module 150.

In this embodiment, the spring 45$q$ biases the press plate 45$p$ in the direction (the direction along the axis line Lx2) at 90 degrees from the direction (the direction along the axis line Lx1) where the transmission shaft 44 is placed when viewed from the lens holder 31. This enables the space for placing the link member 45 to be reduced effectively, thereby reducing the size of the camera module 150. Note that the angle between the axis line Lx1 and the axis line Lx2 is not limited to 90 degrees. The angle between the axis line Lx1 and the axis line Lx2 may be 45 to 135 degrees.

As shown in FIG. 9, the press plate 45$p$, the spring 45$q$ and the press plate 45$r$ are sequentially pushed into a space created in the link body 45$h$. The press plate 45$p$ and the spring 45$q$ are housed in an opening 45$h$7 made in the link body 45$h$. The press plate 45$r$ is housed in an opening 45$h$8 made in the link body 45$h$. In the state shown in FIG. 10, the press plate 45$r$ is fixed by bonding to the link body 45$h$.

According to the embodiment, the link body 45$h$ can be easily assembled. Further, by employing the adequate spring 45$q$, a biasing force against the transmission shaft 44 can be determined. Compared to the case of using a leaf spring, it is possible to effectively prevent the biasing force against the transmission shaft 44 from varying between manufactured products.

As shown in FIG. 9, the press plate 45$p$ is a plate-shaped member having a left end part 45$p$3, a body part 45$p$4, and a right end part 45$p$5. The left end part 45$p$3 and the right end part 45$p$5 restrict up-down (y-axis direction) displacement of the press plate 45$p$ housed in the opening 45$h$7 of the link body 45$h$. The left end part 45$p$3 and the right end part 45$p$5 have a narrower width along the y-axis than the body part 45$p$4. This suppresses the width of the link body 45$h$ along the y-axis from increasing. By suppressing the height (the width along the y-axis) of the link body 45$h$, the moving range of the lens unit 30 can be sufficiently assured. Note that the press plate 45$p$ is preferably made of metal material. For example, the press plate 45$p$ is preferably made of metal material such as zinc alloy or aluminum alloy. This effectively suppresses debris from being generated from the press plate 45$p$ due to friction between the transmission shaft 44 and the press plate 45$p$.

As shown in FIG. 11, the link body 45$h$ has a loop part (shaft holding part) 45$h$1 and a housing part 45$h$2. The loop part 45$h$1 is a loop-shaped portion having an opening through which the transmission shaft 44 is inserted and surrounding the transmission shaft 44 inserted through the opening. The housing part 45$h$2 is a remaining part which is coupled to the loop part 45$h$1.

On the inner surface of the loop part 45$h$1, projecting parts 45$h$3 and 45$h$4 that project toward the transmission shaft 44 are formed. The projecting parts 45$h$3 and 45$h$4 are formed by partly planarizing the inner surface of the loop part 45$h$1. The projecting parts 45$h$3 and 45$h$4 are preferably metal. When the projecting parts 45$h$3 and 45$h$4 are resin, debris can be generated due to friction with the transmission shaft 44. Thus, insert molding of a metal plate by resin is possible; however, it can lead to degradation of accuracy of dimension and cost-up of tooling cost and molding cost. In this example, they are molded by zinc alloy, overcoming being a concealed shape. Note that, the projecting parts 45$h$3 and 45$h$4 (the link body 45$h$) may be molded by aluminum alloy or another metal material, not limited to zinc alloy.

As shown in FIG. 11, the transmission shaft 44 is held between the link body 45$h$ and the press plate 45$p$, abutting at three points against the press plate 45$p$, the projecting part 45$h$3 and the projecting part 45$h$4. Note that the three abutting points are arranged at substantially equal intervals, shifted by 120 degrees from one another.

As shown in FIG. 11, the link body 45$h$ has a curved surface 45$h$2$a$ along the peripheral surface of the lens holder 31. It is thereby possible to place the lens holder 31 in closer proximity to the casing 20 as well as securing the size of the link body 45$h$ to a certain degree. The link body 45$h$ has a tail part 45$h$2$b$ extending in the direction of increasing distance from the transmission shaft 44. By fitting between the tail part 45$h$2$b$ and the casing 20, the link body 45$h$ is fixed to the casing 20.

It should be noted that, in FIG. 11, the link member 45 is in the state of being attached to the casing 20. The spring 45$q$ is confined inside the space of the link body 45$h$ by the press plate 45$r$ and biases the press plate 45$p$ toward the transmission shaft 44. The press plate 45$p$ is biased toward the transmission shaft 44 by the spring 45$q$. The transmission shaft 44 is pressed by the press plate 45$p$ and abuts against the projecting parts 45$h$3 and 45$h$4.

In this embodiment, the press plate 45$p$ and the spring 45$q$ are housed inside the link body 45$h$, and they are confined from the back by the press plate 45$r$. The transmission shaft 44 inserted through the opening of the link body 45$h$ is thereby held tight between the link body 45$h$ and the press plate 45$p$. In other words, the link body 45$h$ and the press plate 45$p$ are in friction engagement with the transmission shaft 44. It is thereby possible to bring the transmission shaft 44 and the link member 45 into friction engagement without accompanying increase in the size of the drive device. The link member 45 and the transmission shaft 44 are abut against each other at three points. It is thereby possible to stably hold the transmission shaft 44.

As shown in FIG. 12, the link member 45 is attached to the casing 20. On the inner surface of the casing 20, protrusions 26$a$ and 26$b$ are formed. The above-described tail part 45$h$2$b$ is fit between the protrusions 26$a$ and 26$b$. The link member 45 is thereby disposed at the corner of the casing 20. By fixing the link member 45 to the casing 20 by fitting, the link member 45 can be strongly fixed to the casing 20. Note that the link member 45 may be fixed to the casing 20 by using a general thermosetting or energy ray curable adhesive.

The side wall of the casing 20 is partly removed. By placing the link body 45*h* in the casing 20, the outer surface of the link body 45*h* mounts flushes with the outer surface of the casing 20. By employing such a structure, the lens holder 31 can be disposed in the position closer to the casing 20. This effectively reduces the size of the camera module 150. Note that, as is obvious from FIG. 12, the width (the width along the x-axis) of the part of the link body 45*h* that mounts flush with the outer surface of the casing 20 is larger than the width (the width along the x-axis) of an opening made in the side wall part of the casing 20. It is thereby possible to effectively prevent an extraneous foreign matter from entering the inside of the casing 20 even when the opening is made in the side wall part of the casing 20.

Note that, although the spring 45*q* biases the press plate 45*p* in the direction (the direction along the axis line Lx2) at 90 degrees from the placement direction (the direction along the axis line Lx1) of the transmission shaft 44 viewed from the lens holder 31 in the above-described structure, it is not limited thereto.

Figure 13:
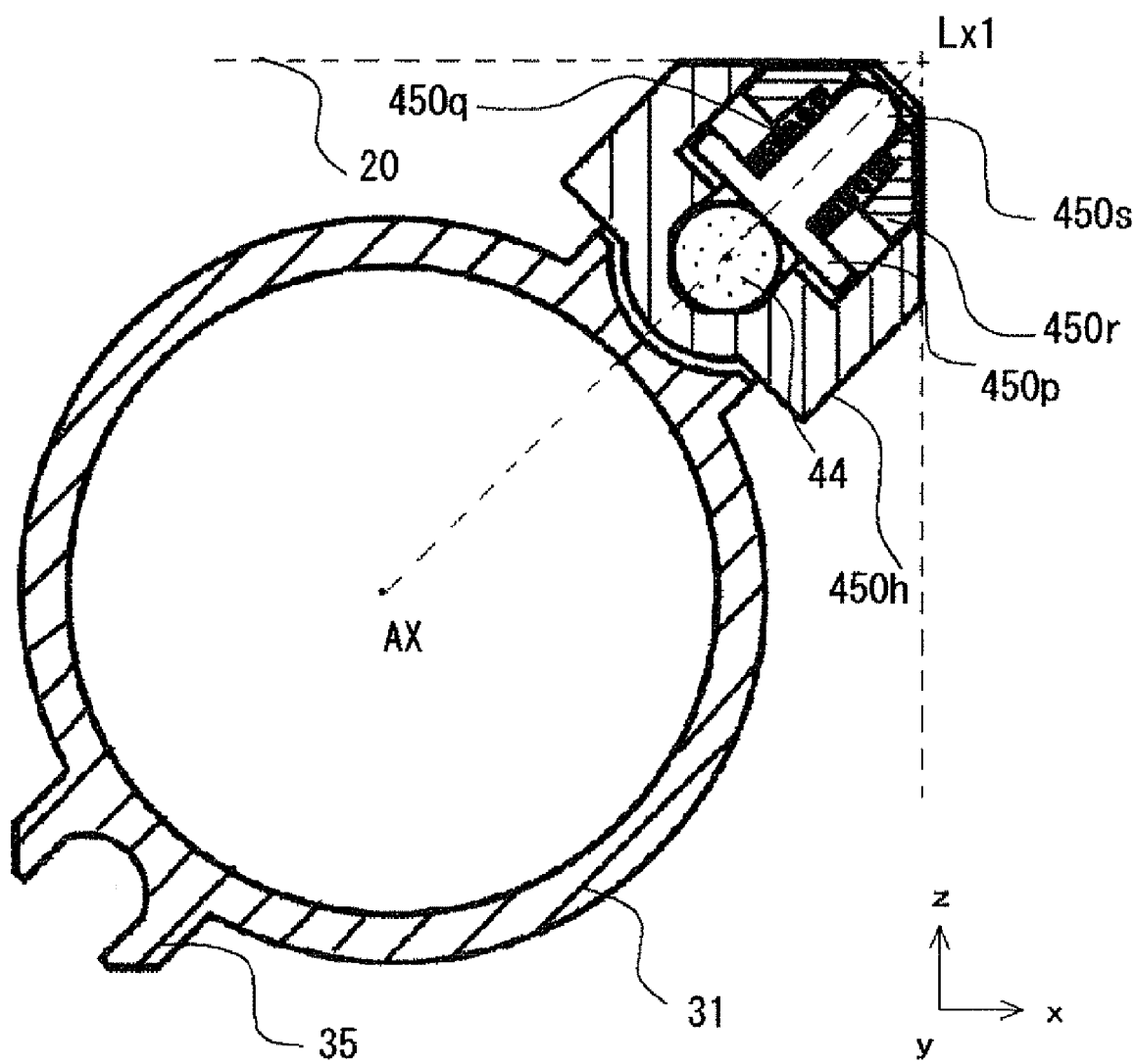
FIG. 13 is a schematic sectional view of a different lens unit according to a first embodiment of the present invention.

Specifically, a structure may be employed in which a spring 450*q* biases a press plate 450*p* on the line (the axis line Lx1) headed in the direction of the center of the transmission shaft 44 viewed from the center of the lens holder 31, i.e. the optical axis, as shown in FIG. 13. To be more specific, the biasing direction of the press plate 450*p* is on the axis line Lx1. This enables the space for placing a link member 450 to be reduced effectively, thereby reducing the size of the camera module 150. Note that, although the biasing direction of the press plate 450*p* is on the axis line Lx1, the biasing direction of the press plate 450*p* may be parallel to the axis line Lx1.

Further, the angle between the axis line Lx1 and the biasing direction of the press plate 450*p* is not limited to 180 degrees. The objective of size reduction is sufficiently achieved if the angle between the axis line Lx1 and the biasing direction of the press plate 450*p* is in the range of 170 to 190 degrees, more preferably 175 to 185 degrees.

Figure 14:
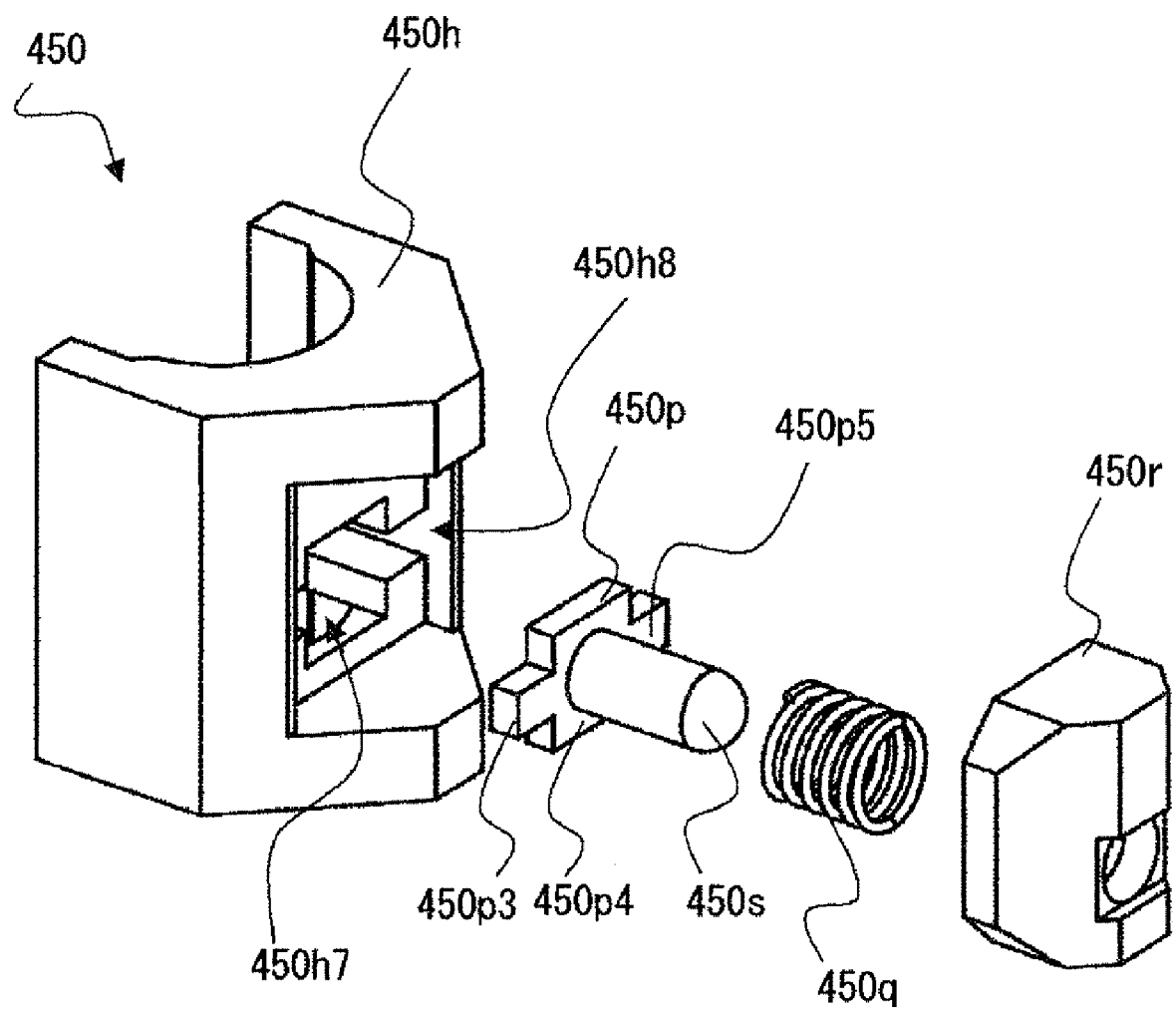
FIG. 14 is a schematic exploded perspective view of a different link member according to the first embodiment of the present invention.
Figure 15:
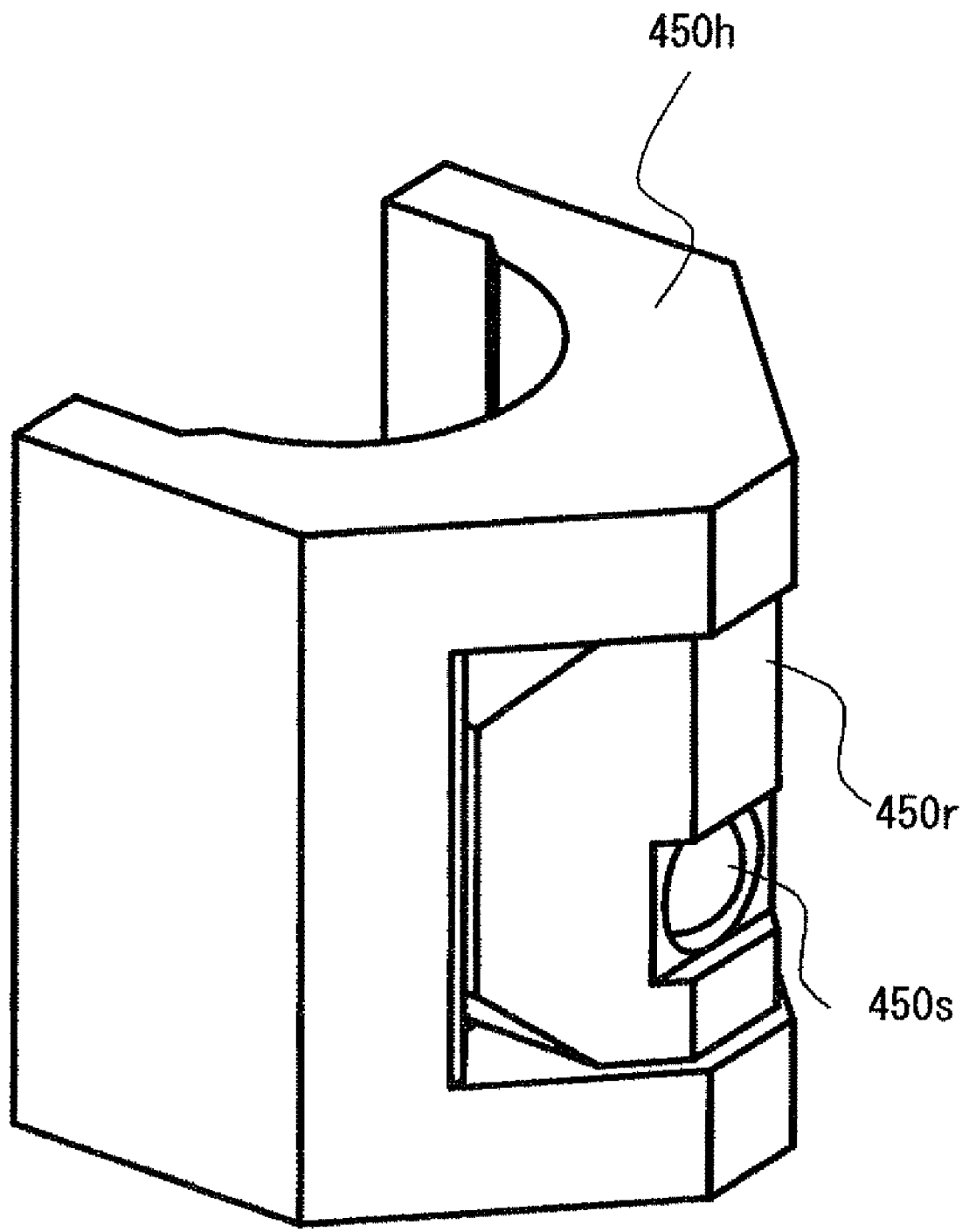
FIG. 15 is a schematic rear view of the different link member according to the first embodiment of the present invention.

As shown in FIG. 14, a press plate (first plate member) 450*p*, a spring (elastic body) 450*q*, and a press plate (second plate member) 450*r* are sequentially pushed into a space created in the link body 450*h*. The press plate 450*p* and the spring 450*q* are housed in an opening 450*h*7 made in the link body 450*h*. The press plate 450*r* is housed in an opening 450*h*8 made in the link body 450*h*. In the state shown in FIG. 15, the press plate 450*r* is fixed by bonding to the link body 450*h*.

In the above-described structure in which the spring 450*q* biases the press plate 450*p* in a direction substantially parallel to the line (the axis line Lx1) headed in the direction of the center of the transmission shaft 44 from the center of the lens holder 31 as well, the link body 450*h* can be easily assembled.

As shown in FIG. 14, the press plate 450*p* is a member which has a protruding part 450*s* at the center of a plate-shaped member made up of a left end part 450*p*3, a body part 450*p*4 and a right end part 450*p*5. The left end part 450*p*3 and the right end part 450*p*5 restrict up-down (y-axis direction) displacement of the press plate 450*p* housed in the opening 450*h*7 of the link body 450*h*. The left end part 450*p*3 and the right end part 450*p*5 have a narrower width along the y-axis than the body part 450*p*4. This suppresses the width of a loop part 450*h*1, which is a part of the link body 450*h* for holding the transmission shaft 44, along the y-axis from increasing. By suppressing the thickness (the width along the y-axis) of the loop part 450*h*1, the moving range of the lens unit 30 can be sufficiently assured. The protruding part 450*s* has a columnar shape, and the spring 450*q* is inserted on its periphery. The protruding part 450*s* serves as an aid knob for facilitating insertion of the press plate 450*p* into the link body 450*h* and also restricts the movement of the spring 450*q*. By suppressing the height (the width along the y-axis) of the link body 450*h*, the moving range of the lens unit 30 can be sufficiently assured. Note that the press plate 450*p* is preferably made of metal material. For example, the press plate 450*p* is preferably made of metal material such as zinc alloy or aluminum alloy. This effectively prevents debris from being generated from the press plate 450*p* due to friction between the transmission shaft 44 and the press plate 450*p*.

Figure 16:
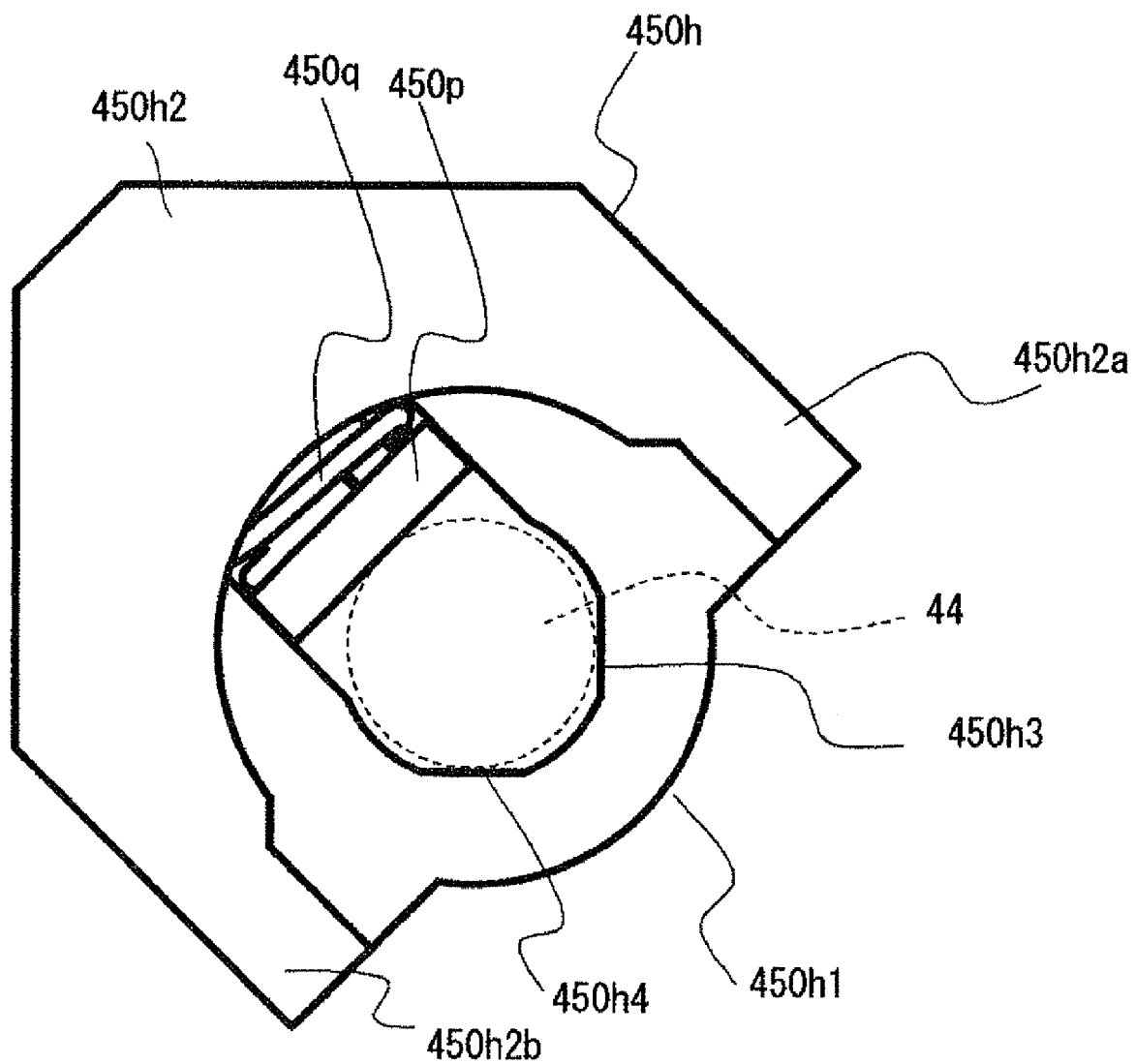
FIG. 16 is a schematic top view of the different link member according to the first embodiment of the present invention.

As shown in FIG. 16, the link body 450*h* has the loop part (shaft holding part) 450*h*1 and a housing part 450*h*2. The loop part 450*h*1 is a loop-shaped portion having an opening through which the transmission shaft 44 is inserted and surrounding the transmission shaft 44 inserted through the opening. The housing part 450*h*2 is a remaining part which is coupled to the loop part 450*h*1.

On the inner surface of the loop part 450*h*1, projecting parts 450*h*3 and 450*h*4 that project toward the transmission shaft 44 are formed. The projecting parts 450*h*3 and 450*h*4 are formed by partly planarizing the inner surface of the loop part 450*h*1. The projecting parts 450*h*3 and 450*h*4 are preferably metal. When the projecting parts 450*h*3 and 450*h*4 are resin, debris can be generated due to friction with the transmission shaft 44. Thus, insert molding of a metal plate by resin is possible; however, it can lead to degradation of accuracy of dimension and cost-up of tooling cost and molding cost. In this example, they are molded by zinc alloy, overcoming being a concealed shape. Note that, the projecting parts 450*h*3 and 450*h*4 (the link body 450*h*) may be molded by aluminum alloy or another metal material, not limited to zinc alloy.

As shown in FIG. 16, the transmission shaft 44 is held between the link body 450*h* and the press plate 450*p*, abutting at three points against the press plate 450*p*, the projecting part 450*h*3 and the projecting part 450*h*4. Note that the three abutting points are arranged at substantially equal intervals, shifted by 120 degrees from one another.

As shown in FIG. 16, the link body 450*h* has tail parts 450*h*2*a* and 450*h*2*b*. By fitting between the tail parts 450*h*2*a* and 450*h*2*b* and the casing 20, the link body 450*h* is fixed to a casing 200.

It should be noted that, in FIG. 16, the link member 450 is in the state of being attached to the casing 200. The spring 450*q* is confined inside the space of the link body 450*h* by the press plate 450*r* and biases the press plate 450*p* toward the transmission shaft 44. The press plate 450*p* is biased toward the transmission shaft 44 by the spring 450*q*. The transmission shaft 44 is pressed by the press plate 450*p* and abuts against the projecting parts 450*h*3 and 450*h*4.

Specifically, the press plate 450*p* and the spring 450*q* are housed inside the link body 450*h*, and they are confined from the back by the press plate 450*r*. The transmission shaft 44 inserted through the opening of the link body 450*h* is thereby held tight between the link body 450*h* and the press plate 450*p*. In other words, the link body 450*h* and the press plate 450*p* are in friction engagement with the transmission shaft 44. It is thereby possible to bring the transmission shaft 44 and the link member 450 into friction engagement without accompanying increase in the size of the drive device. The link member 450 and the transmission shaft 44 are abut against each other at three points. It is thereby possible to stably hold the transmission shaft 44.

Figure 17:
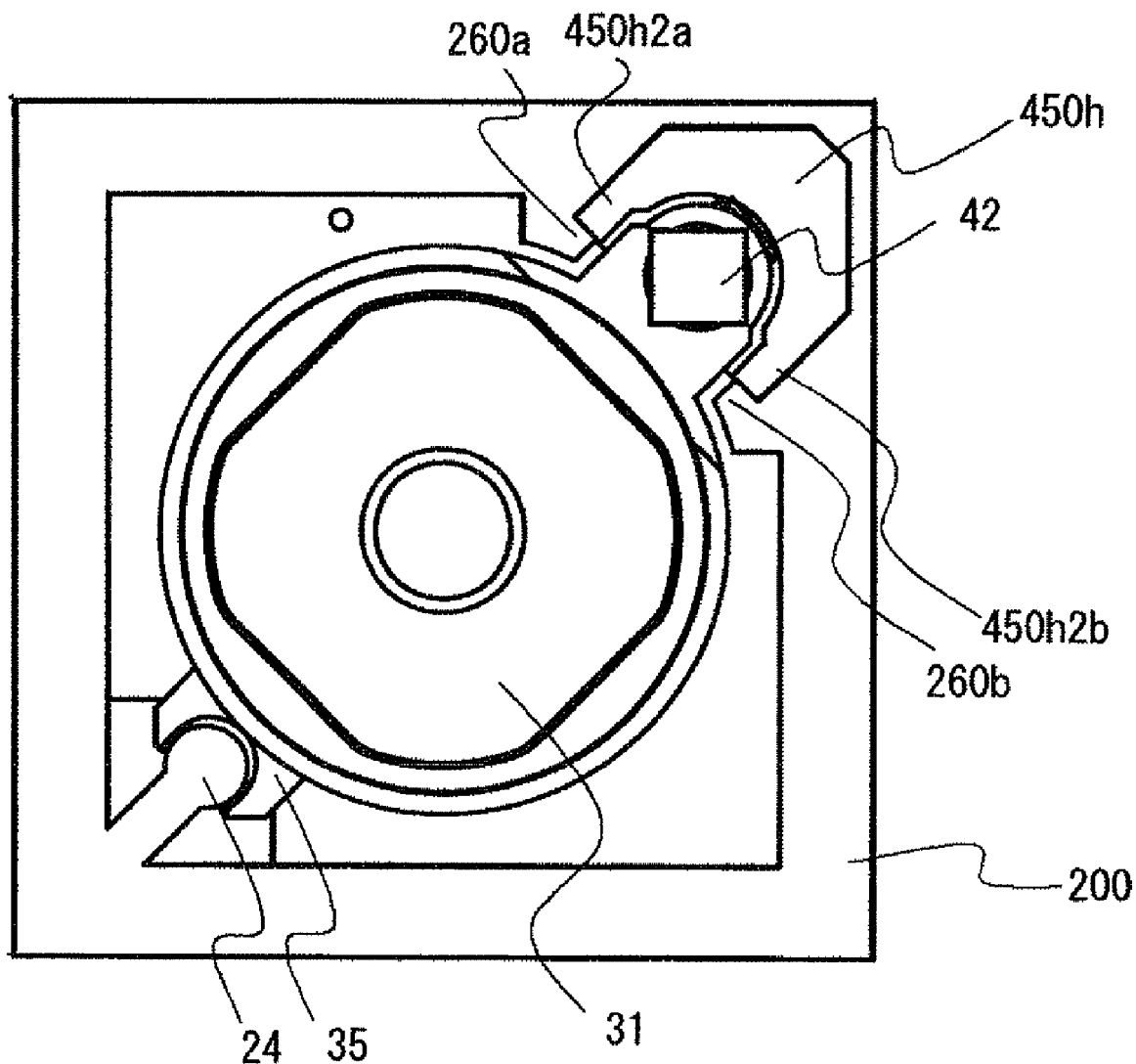
FIG. 17 is a schematic partial top view of a different camera module according to the first embodiment of the present invention.

As shown in FIG. 17, the link member 450 is attached to the casing 200. On the inner surface of the casing 200, protrusions 260a and 260b are formed. The above-described tail parts 450h2a and 450h2b fit between the protrusions 260a and 260b. The link member 450 is thereby disposed at the corner of the casing 200. By fixing the link member 450 to the casing 200 by fitting, the link member 450 can be strongly fixed to the casing 200. Note that the link member 450 may be fixed to the casing 200 by using a general thermosetting or energy ray curable adhesive.

The side wall of the casing 200 is partly removed. By placing the link body 450h in the casing 200, the outer surface of the link body 450h mounts flushes with the outer surface of the casing 200. By employing such a structure, the lens holder 31 can be disposed at the position closer to the casing 200. This effectively reduces the size of the camera module 150. Note that, as is obvious from FIG. 17, the width (the width along the x-axis) of the part of the link body 450h that mounts flush with the outer surface of the casing 200 is larger than the width (the width along the x-axis) of an opening made in the side wall part of the casing 200. It is thereby possible to effectively prevent an extraneous foreign matter from entering the inside of the casing 200 even when the opening is made in the side wall part of the casing 200.

Note that, by using a manufacturing method called insert molding, the link member 45 (450) and the casing 20 (200) may be integrally formed. In this method, when molding the casing 20 (200) with a die after completing assembly of the lens unit 30, the link member 45 (450) of the lens unit 30 is buried in a part of the die, thereby making integral molding of the casing 20 (200) and the lens unit 30. In this case, the accuracy of the position of the lens unit 30 relative to the casing 20 (200) can be enhanced compared to the above-described way of attachment by fitting.

As shown in FIGS. 12 and 17, in this embodiment, the casing 20 (200) has equal horizontal and vertical widths. The shape of the casing 20 (200) when viewed from above is a square. The optical axis of the lens is set in close proximity to the intersection of the diagonal lines of the casing 20 (200). This enables the positioning of the optical axis of the lens to be made easily by the positioning of the casing 20 (200). Note that, according to results of a prototype by the inventors, employment of the above-described link member 45 (450) reduced the vertical width and the horizontal width of the casing 20 more effectively than before.

Note that, as shown in FIGS. 12 and 17, a rail 24 for guiding the displacement of the lens unit 30 is formed in the casing 20 (200). The rail 24 is accepted by a rail backing part 35 formed on the periphery of the lens holder 31, and the lens holder 31 abuts against the casing 20 (200) in a slidable manner. According to drive of the piezo element 42, the lens holder 31 is displaced along the rail 24.

Finally, an operation of the camera module 150 is described hereinafter with reference to FIGS. 18 to 30. First, a structure of a cellular phone into which the camera module 150 is incorporated is described by referring to FIGS. 18 and 19.

Figure 18:
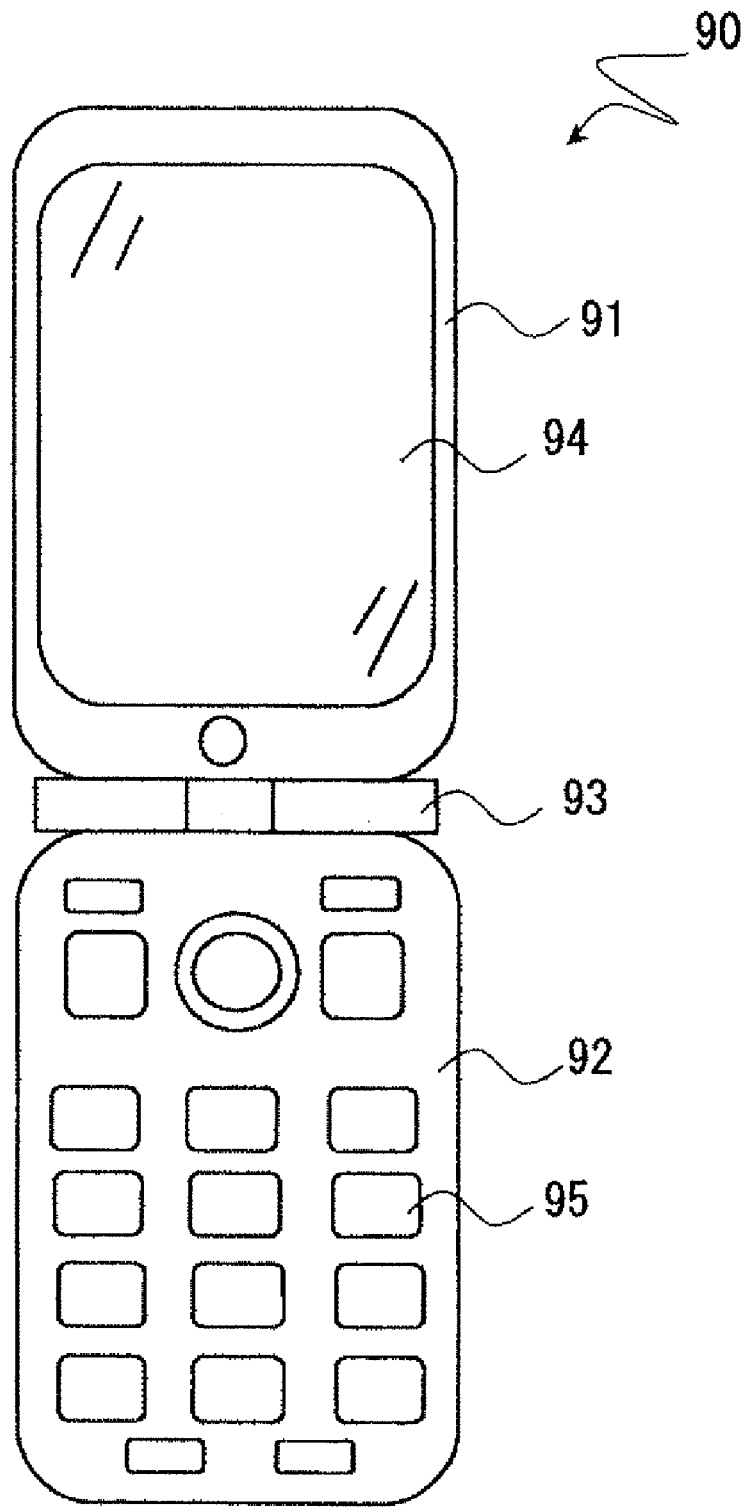
FIG. 18 is a schematic view of a cellular phone according to the first embodiment of the present invention.

The camera module 150 is incorporated into a cellular phone (electronic apparatus) 90 shown in FIG. 18.

As shown in FIG. 18, the cellular phone 90 includes an upper body (first member) 91, a lower body (second member) 92, and a hinge 93. The upper body 91 and the lower body 92 are both flat-shaped members made of plastic, and they are joined via the hinge 93. The upper body 91 and the lower body 92 are configured so that they can be freely opened and closed by the hinge 93. When the upper body 91 and the lower body 92 are in the closed state, the cellular phone 90 is in the form of a flat-shaped member with the upper body 91 and the lower body 92 overlapping with each other.

The upper body 91 has a display unit 94 on its inner surface. On the display unit 94, information identifying a caller (name, telephone number etc.), an address book stored in a storage unit of the cellular phone 90 or the like is displayed. A liquid crystal display device is incorporated below the display unit 94.

The lower body 92 has a plurality of buttons 95 on its inner surface. A user of the cellular phone 90 operates the buttons 95 to open the address book, make a phone call or set the phone to a silent mode, for example, and operates the cellular phone 90 as intended. A user of the cellular phone 90 activates the camera module 150 in the cellular phone 90 by operating the buttons 95.

Figure 19:
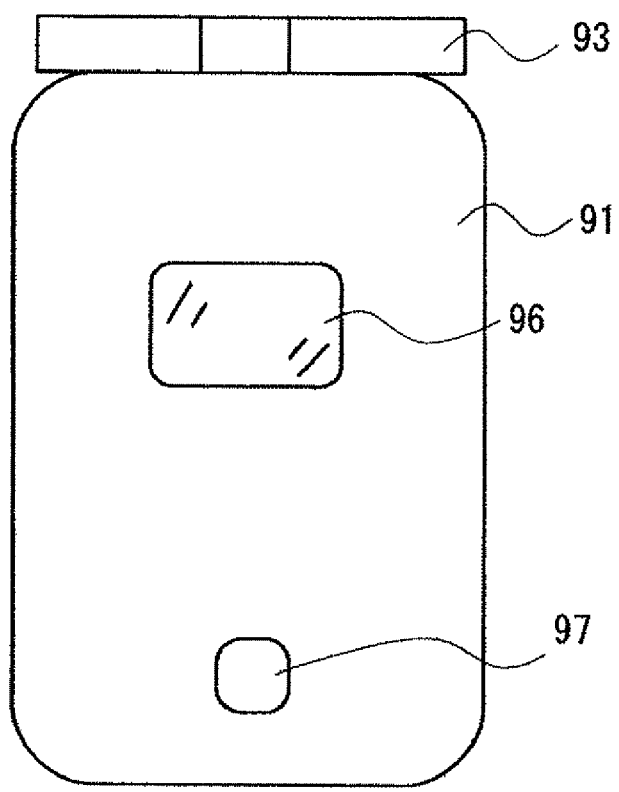
FIG. 19 is a schematic view of the cellular phone according to the first embodiment of the present invention.

FIG. 19 shows the structure of the front face (top face) of the cellular phone 90. As shown in FIG. 19, a display region 96 is placed on the front face of the upper body 91. A LED in the display region 96 emits light to thereby let a user recognize incoming call. The above-described camera module 150 is incorporated into a region 97 on the front face of the upper body 91.

Figure 20:
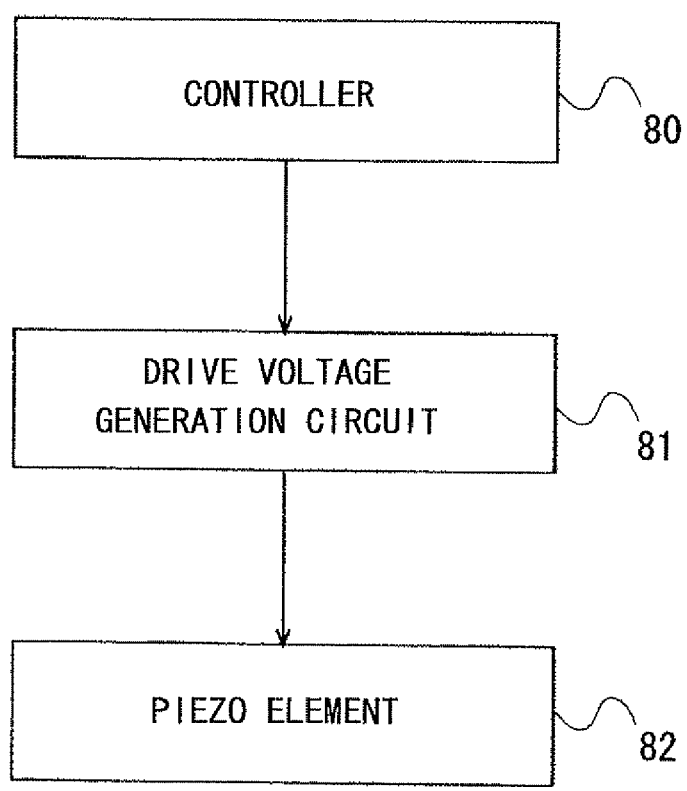
FIG. 20 is a schematic block diagram of a drive device according to the first embodiment of the present invention.

Hereinafter, a system configuration for making the camera module 150 operate (a configuration of a drive unit of an actuator) is described with reference to FIG. 20. As shown in FIG. 20, output of a controller 80 is connected to a drive voltage generation circuit 81. Output of the drive voltage generation circuit 81 is connected to a piezo element 82.

The controller 80 is a CPU incorporated into the cellular phone 90 and executes a program and generates various instructions. The controller 80 activates the function of the camera module according to the operation of the cellular phone 90 by a user. The drive voltage generation circuit 81 generates a drive voltage to be applied to the piezo element 82 according to a control signal from the controller 80. At this time, the autofocus function of the camera module is in the on-state, and the image pickup device is in the imaging mode. Note that the piezo element 82 corresponds to the above-described piezo element 42.

On the assumption of the above points, the operation of the camera module 150 (particularly, the operation to displace the lens holder 31) is described hereinafter with reference to FIGS. 21A and 21B. In this example, a sawtooth-shaped drive voltage (which is hereinafter sometimes referred to simply as a drive waveform) is applied to the piezo element 42. Note that the waveform of the drive voltage is not limited to the sawtooth-shape.

Figure 21A:
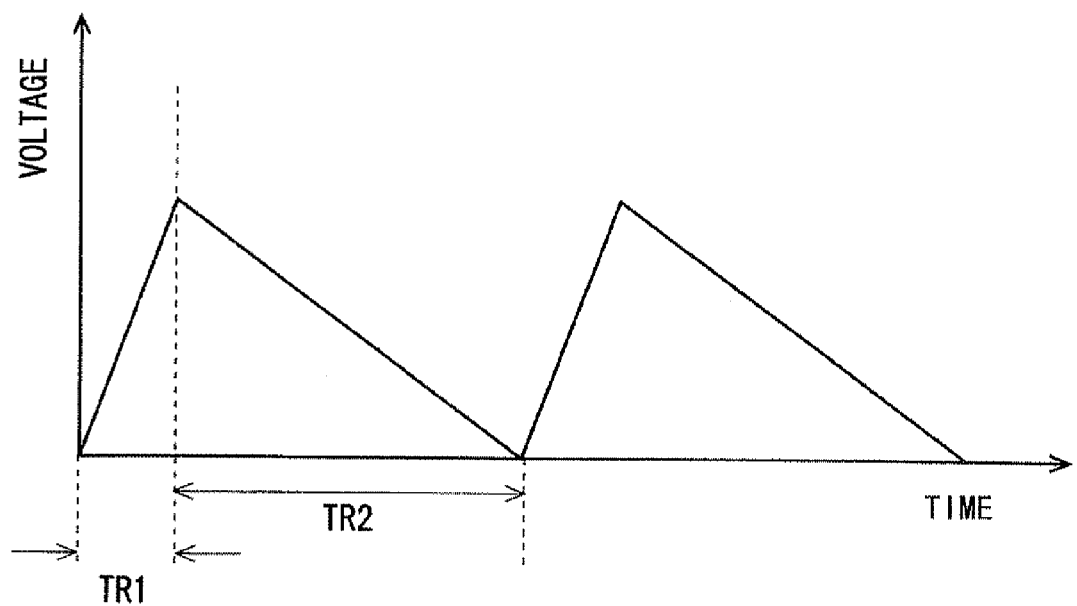
FIG. 21A is a schematic timing chart showing a way of applying a drive waveform according to the first embodiment of the present invention.

First, the case where the drive waveform shown in FIG. 21A is applied to the piezo element 42 is described. Note that, in the case shown in FIG. 21A, a rising period TR1 of the drive waveform is shorter than a falling period TR2.

The lens holder 31 is displaced forward during the rising period TR1 of the drive waveform. On the other hand, the lens holder 31 is not displaced during the falling period TR2 of the drive waveform. By applying the drive waveform in which the rising period TR1 is shorter than the falling period TR2 to the piezo element 42, the lens holder 31 can be displaced forward (on the object side).

Figure 21B:
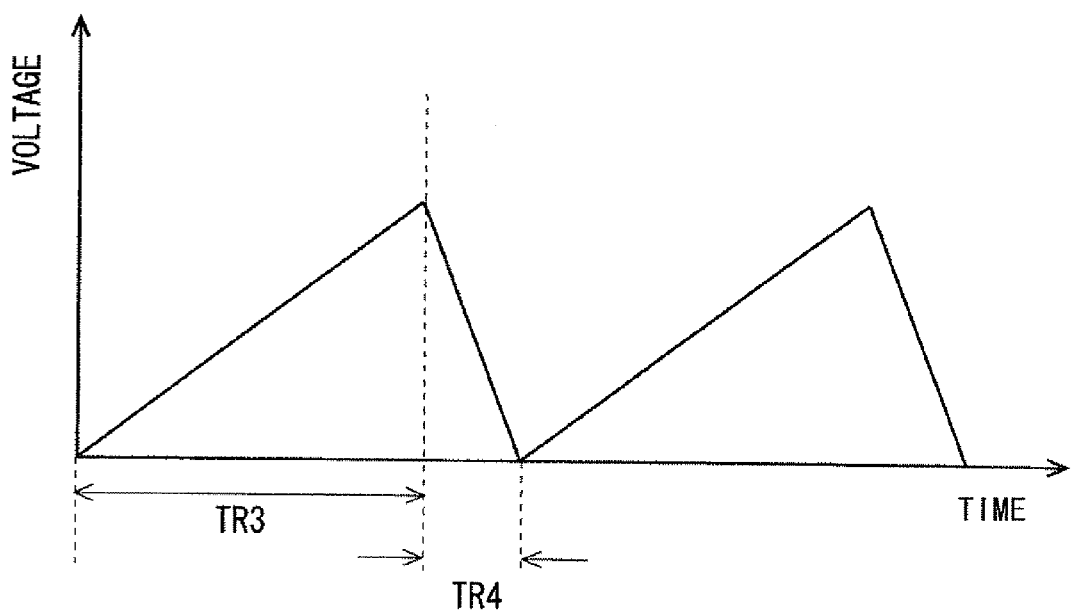
FIG. 21B is a schematic timing chart showing a way of applying a drive waveform according to the first embodiment of the present invention.

Next, the case where the drive waveform shown in FIG. 21B is applied to the piezo element 42 is described. Note that, in the case shown in FIG. 21B, a rising period TR3 of the drive waveform is longer than a falling period TR4.

The lens holder 31 is not displaced during the rising period TR3 of the drive waveform. On the other hand, the lens holder 31 is displaced rearward during the falling period TR4 of the drive waveform. By applying the drive waveform in which the rising period TR3 is longer than the falling period TR4 to the piezo element 42, the lens holder 31 can be displaced in the backward direction (on the image pickup device side). The drive waveform preferably satisfies the following relational expression where the rising period of the rising signal is T1 and the falling period of the falling signal is T2. This point is obvious from the description given later.

$$\mathrm{Min}(T1,T2)/(T1+T2) \leq 0.1$$

The circuit and its operation of the drive voltage generation circuit 81 are described with reference to FIGS. 22 and 23.

Figure 22:
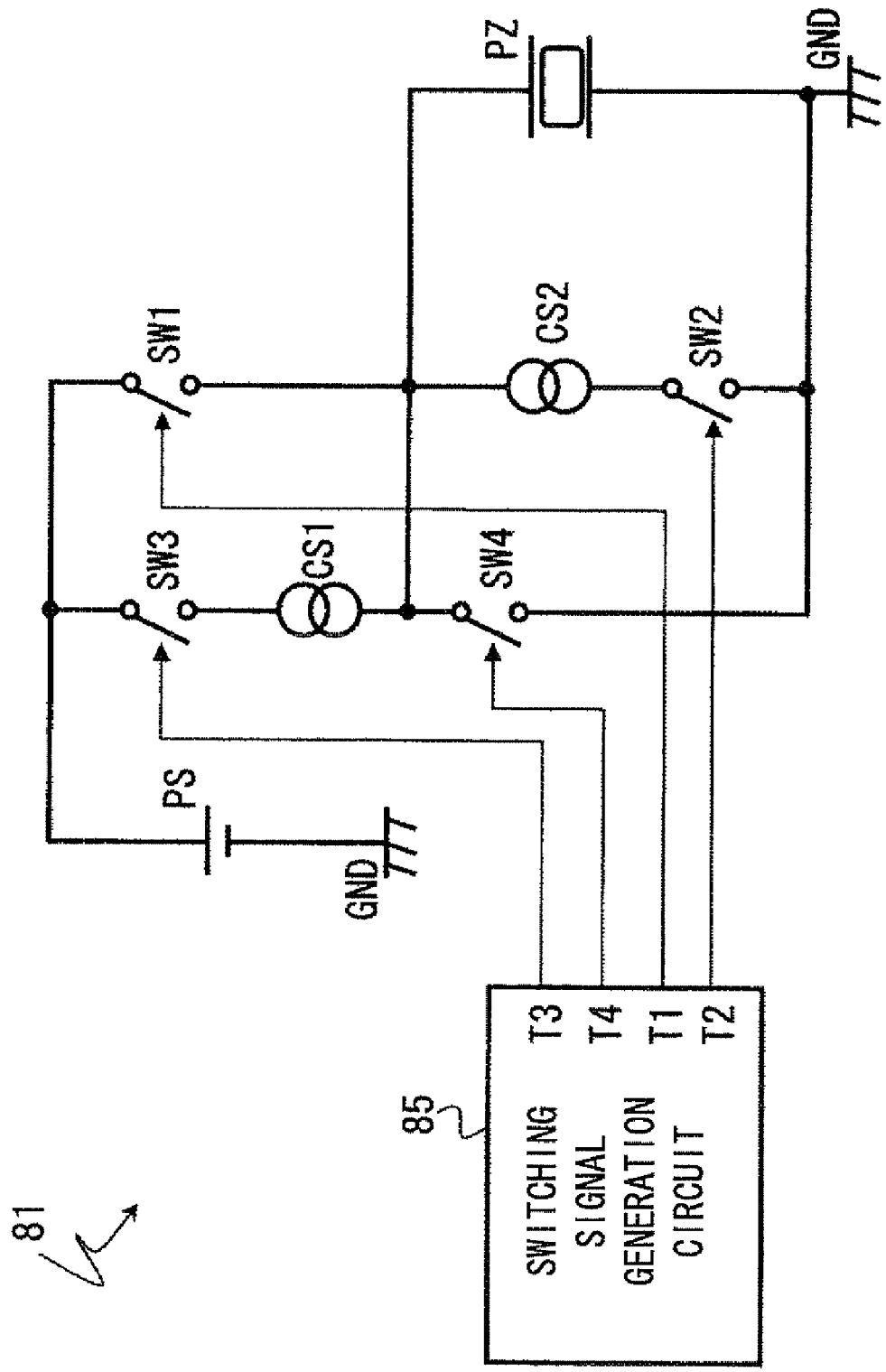
FIG. 22 is a schematic circuit diagram of a drive voltage generation circuit according to the first embodiment of the present invention.

As shown in FIG. 22, the drive voltage generation circuit 81 includes a switching signal generation circuit (pulse signal generation circuit) 85, switches SW1 to SW4, current sources CS1 and CS2, and a power source PS. Note that the output of the controller 80 is connected to the switching signal generation circuit.

The switch SW1, the current source CS1 and the switch SW2 are connected in series between the power source PS and a ground potential GND. The switch SW3, the current source CS2 and the switch SW4 are connected in series between the power source PS and the ground potential GND. A node between the current source CS1 and the switch SW2 is connected to a node between the switch SW3 and the current source CS2. Further, the node between the current source CS1 and the switch SW2 and the node between the switch SW3 and the current source CS2 are connected to one end of the piezo element PZ. The other end of the piezo element PZ is connected to the switch SW2, the switch SW4 and the ground potential GND. Note that the switches SW1 to SW4 are switching elements such as MOS (Metal Oxide Semiconductor) transistors.

The operational states of the switches SW1 to SW4 are controlled by the switching signal generation circuit 85 as shown in FIG. 23. The switching signal generation circuit 85 has terminals T1 to T4. The operational states of the switches SW1 to SW4 are determined by switching signals VS1 to VS4 output from the terminals T1 to T4, respectively. For example, when the switching signal is High level, the switches SW1 to SW4 are in the on-state. When the switching signal is Low level, the switches SW1 to SW4 are in the off-state.

In the first state shown in FIG. 23, the piezo element PZ is quickly charged by the current source CS1. In the second state, the piezo element PZ is slowly discharged. In the third state, the piezo element PZ is slowly charged by the current sources CS1 and CS2. In the fourth state, the piezo element PZ is quickly discharged. By repeatedly switching between the first state and the second state, the lens holder 31 is displaced forward (on the object side). By repeatedly switching between the third state and the fourth state, the lens holder 31 is displaced backward (on the image pickup device side).

Motion control of the actuator is further described with reference to FIGS. 24 to 27.

Figure 24:
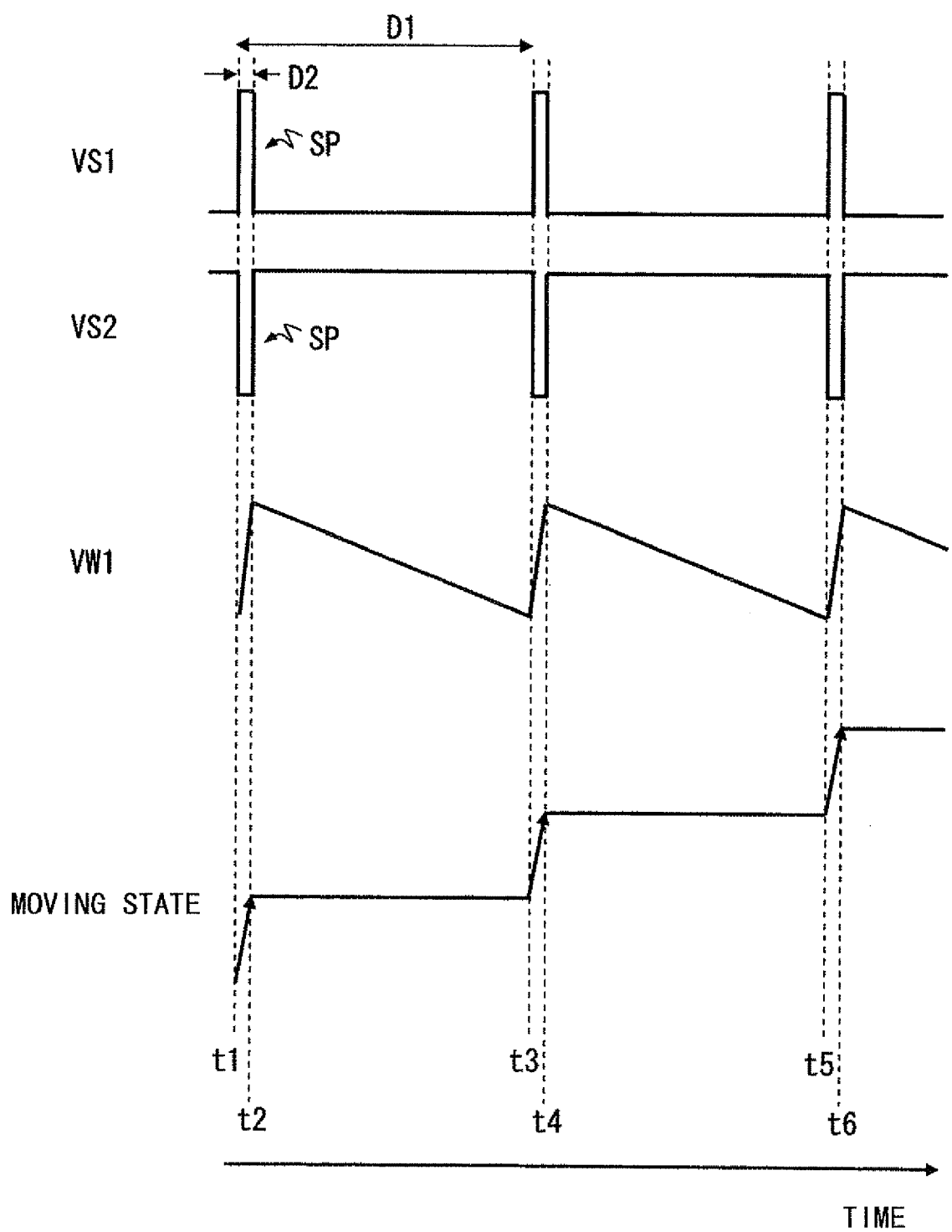
FIG. 24 is a schematic timing chart showing a relationship between a signal waveform and a moving state of a lens according to the first embodiment of the present invention.

As shown in FIG. 24, the switching signal VS1 from the terminal T1 of the switching signal generation circuit 85 is supplied to the switch SW1, and the switching signal VS2 from the terminal T2 is supplied to the switch SW2. A drive voltage VW1 is thereby applied to the piezo element PZ. According to it, the lens holder 31 is displaced forward. In FIG. 24, the displacement of the lens holder 31 is schematically illustrated by arrows. Specifically, the lens holder 31 is displaced between time t1 and time t2 and not displaced between time t2 and time t3. The same applies to the other periods.

Note that the switching signal VS1 and the switching signal VS2 are in inverse relationship to each other. One switching signal can be generated by inverting the other switching signal, and the circuit configuration of the switching signal generation circuit can be simplified. Further, the time interval between time t1 and time t2 is sufficiently shorter than the time interval between time t2 and time t3. This point is obvious from description about a duty ratio, which is given later.

Figure 25:
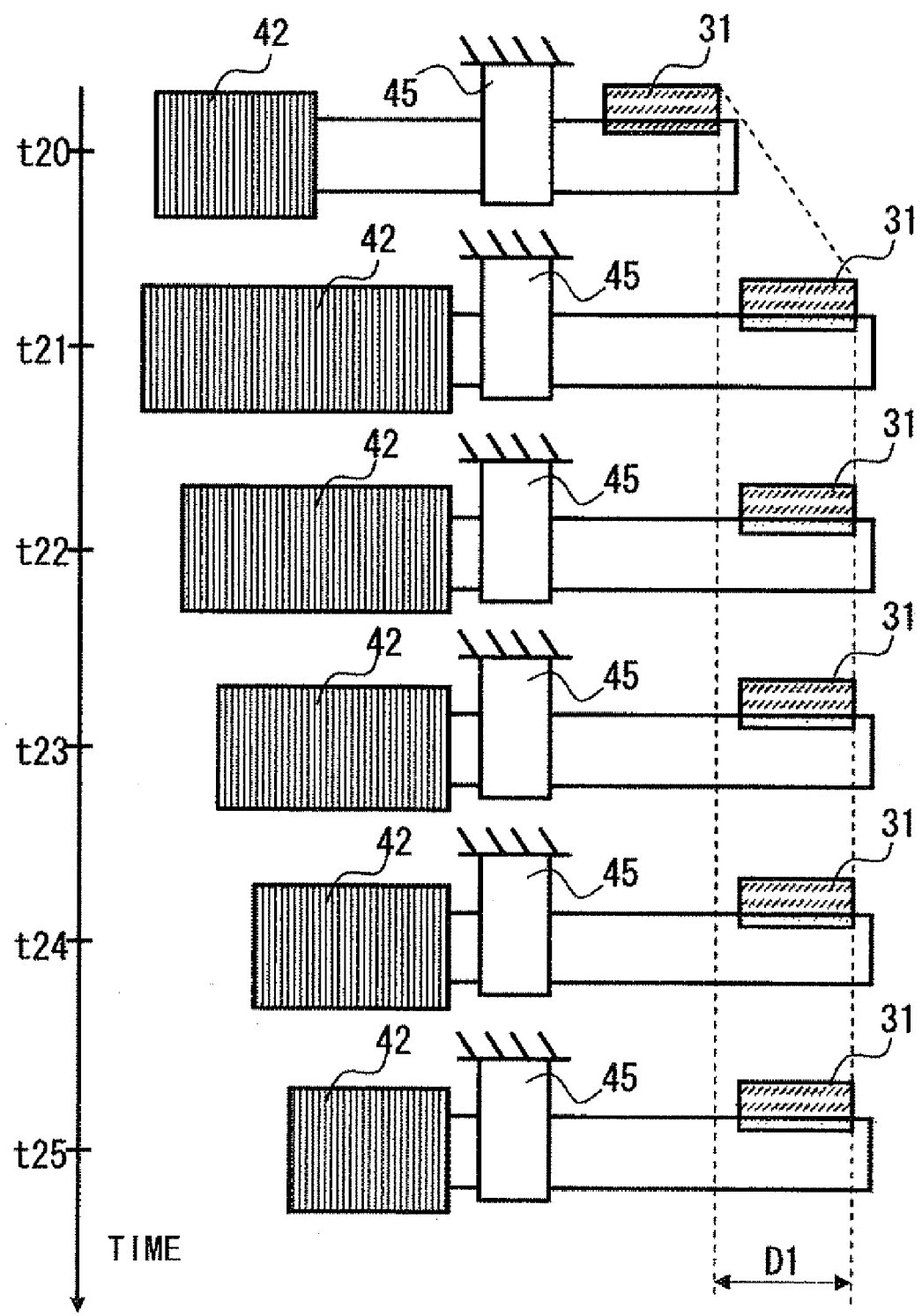
FIG. 25 is a schematic explanatory view showing a relationship between expansion and contraction of a piezo element and displacement of a lens holder according to the first embodiment of the present invention.

In this embodiment, the lens holder 31 is displaced during the period corresponding to a supply period of a switching pulse SP contained in the switching signals VS1 and VS2. According to study of the inventors, expansion and contraction of the piezo element 42 and displacement of the lens holder 31 are linked as shown in FIG. 25. The drive voltage VW1 rises steeply during time t20 (corresponding to time t1 in FIG. 24) to time t21 (corresponding to time t2 in FIG. 24). In response to the rising of the voltage VW1, the piezo element PZ expands. In response to the expansion of the piezo element PZ, the lens holder 31 is displaced in the direction of increasing distance from the shaft holding part 45. The drive voltage VW1 falls slowly during time t21 to time t25 (corresponding to time t3 in FIG. 24). In response to the falling of the voltage VW1, the piezo element 42 contracts relatively slowly. At this time, the piezo element PZ stays in position by its inertia.

As is obvious from the above description, in the actuator according to the embodiment, the lens holder 31 is displaced relative to the shaft holding part 45 when the piezo element 42 expands suddenly. In other words, the lens holder 31 is not displaced relative to the shaft holding part 45 when the piezo element 42 contracts slowly. In this case, it is considered that, in order to efficiently displace the lens holder 31, it would be appropriate to make the piezo element 42 expand in a short period of time by narrowing the pulse width of the switching pulse SP. In view of the point that it is necessary to secure the discharge time of the current accumulated in the piezo element 42, it is considered that it would be appropriate to set a duty ratio of the switching signal to be small.

Figure 26A:
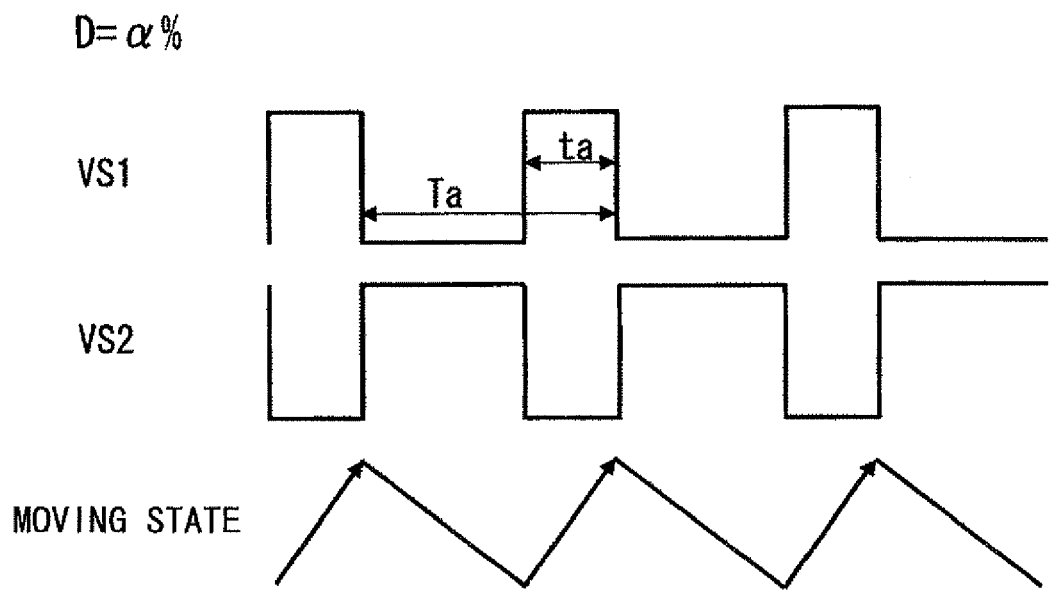
FIG. 26A is an explanatory view to explain an effect of adjustment of a duty ratio of a switching signal on displacement of a lens holder according to the first embodiment of the present invention.
Figure 26B:
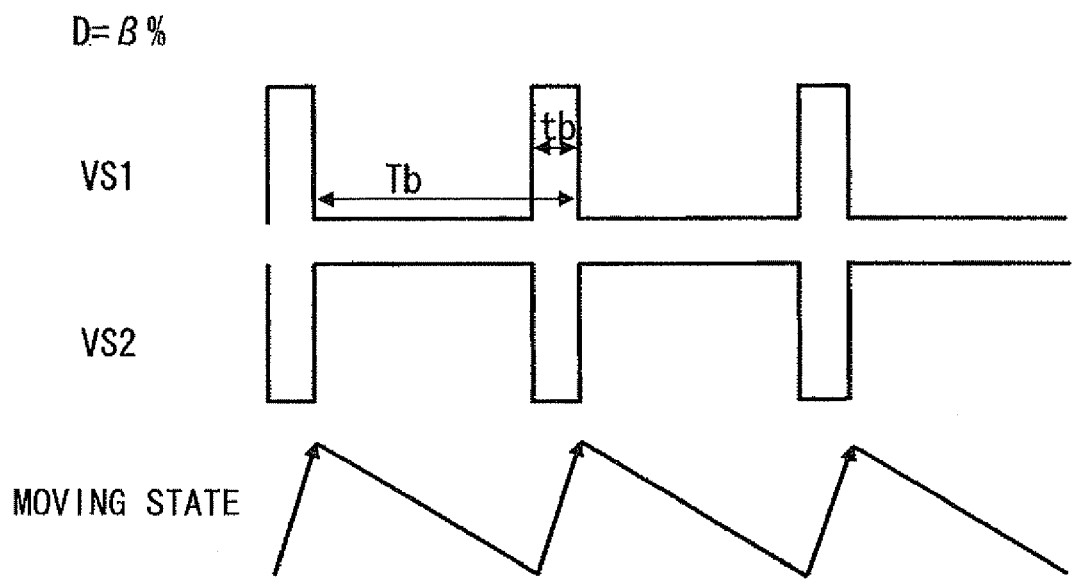
FIG. 26B is an explanatory view to explain an effect of adjustment of a duty ratio of a switching signal on displacement of a lens holder according to the first embodiment of the present invention.

Specifically, as shown in FIGS. 26A and 26B, it is considered that the lens holder 31 can be displaced efficiently by setting the duty ratio of the switching signal to α % to β % (where β %<α %). More efficient displacement of the lens holder 31 enables faster displacement of the lens holder 31. Note that the duty ratio D can be calculated by pulse width/period. As shown in FIG. 26A, it is calculated as to/Ta=α. As shown in FIG. 26B, it is calculated as tb/Tb=β. ta and tb are pulse widths. Ta and Tb are periods.

Setting of the switching signal is described with reference to FIG. 27. Note that, in FIG. 27, the duty ratio of the switching signal was in the range of 4% to 40%. Further, the frequency band of the switching signal was in the range of 40 kHz to 200 kHz. When the duty ratio is 2% or below, it is expected that the level of the drive voltage applied to the piezo element decreases. Thus, in this example, the duty ratio was set to the value of 2% or above (i.e. the minimum duty ratio=4%).

Test results are rated on a scale of ○, Δ and x. The characteristics of the actuator get better in the order of ○>Δ>x. In the case of ○, the actuator operates without problems fast at the working speed of 1 mm/s or above. In the case of Δ, the operating characteristics of the actuator are degraded compared to the case of ○. In the case of x, it is difficult to ensure the normal operation of the actuator.

Figure 27:
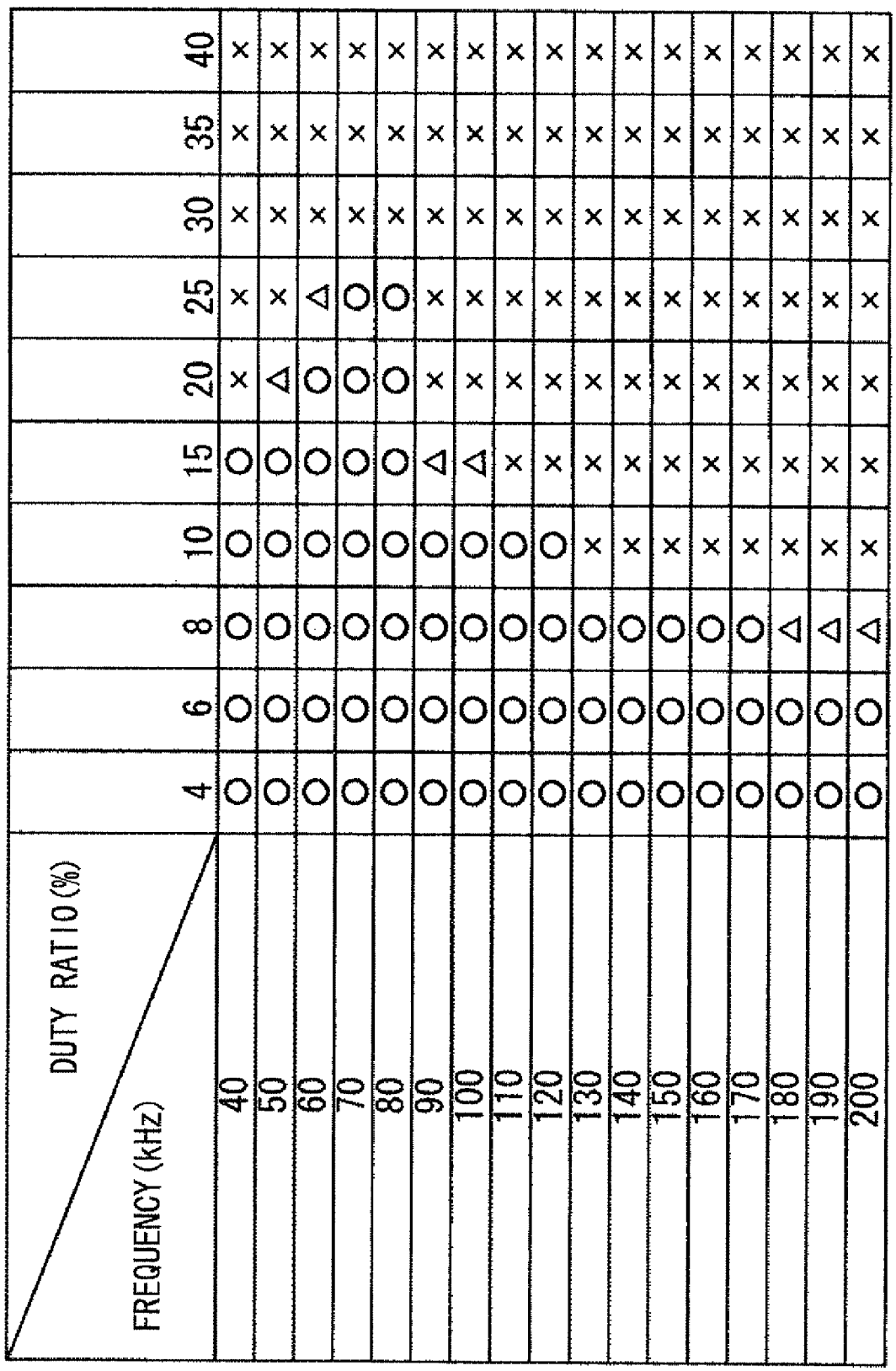
FIG. 27 is a table showing a result of evaluating an operating state of an actuator according to the first embodiment of the present invention.

As shown in FIG. 27, according to the evaluation results of a prototype of the actuator in this embodiment, when the duty ratio D of the switching signal is 25%, the actuator can operate normally on condition that an appropriate frequency is selected. Compared to the case where the duty ratio D exceeds 30%, the waveform of the drive voltage is steeper, thus enabling efficient displacement of the lens holder 31.

Preferably, the duty ratio D of the switching signal is 20%. This enables enlargement of the selectable frequency band in addition to the above-described advantage. By the enlargement of the selectable frequency band, the flexibility at design time increases. Further, it is possible to avoid the adverse affect (decrease in yield etc.) due to fluctuations of the frequency of the actually generated switching signal.

More preferably, the duty ratio D of the switching signal is 15%. This enables further enlargement of the selectable frequency band in addition to the above-described advantage, thus obtaining the same advantageous effects as above.

More preferably, the duty ratio D of the switching signal is 10% or below. This enables further enlargement of the selectable frequency band in addition to the above-described advantage, thus obtaining the same advantageous effects as above.

More preferably, the duty ratio D of the switching signal is 8% or below. This enables further enlargement of the selectable frequency band in addition to the above-described advantage, thus obtaining the same advantageous effects as above. In the testing of this time, the normal operation was observed with up to about 300 kHz.

More preferably, the duty ratio D of the switching signal is 6% or below. This enables further enlargement of the selectable frequency band in addition to the above-described advantage, thus obtaining the same advantageous effects as above. Note that the results shown in FIG. 27 are based on the assumption that the lens holder 31 is displaced forward. In the case of displacing the lens holder 31 backward, the duty ratio D is a different value. For example, to obtain the same result as the duty ratio D=10% applied for the forward direction, the duty ratio is set to D=90% for the backward direction.

As is obvious form the above description, by setting the duty ratio D of the switching signal to be small, it is possible to significantly enlarge the selectable frequency band in addition to efficiently displace the lens holder 31. By the enlargement of the selectable frequency band, the flexibility at design time increases. Further, it is possible to avoid the adverse affect (decrease in yield etc.) due to fluctuations of the frequency of the actually generated switching signal. If the switching signals VS1 and VS2 are set in the high frequency band, the lens holder 31 can be displaced faster than before. This enables improvement of the operating characteristics of the actuator.

In this embodiment, the drive voltage VW1 is generated based on the switching signal with the duty ratio of 10% (D≦10%) or less, and the piezo element PZ is driven by the drive voltage VW1. This enables fast and efficient displacement of the lens holder 31 and also enables enlargement of the selectable frequency band.

As schematically shown in FIG. 24, the duty ratio D is calculated by D=D2/D1×100. However, D2 corresponds to the pulse width of the switching pulse SP. D1 corresponds to the period of the switching pulse SP.

Further, in this embodiment, the lens holder 31, the piezo element 42 and the transmission shaft 44 are movable relative to the casing 20. In other words, the lens holder 31, the piezo element 42 and the transmission shaft 44 constitute a movable part. It is thereby possible to shift the resonance frequency to the high frequency side and obtain the continuous available frequency band. By setting the switching signal with an appropriate duty ratio, it is further possible to obtain the continuous available frequency band. Further, making the degree of rising or the degree of falling of the steep rising signal or the steep falling signal by which the lens holder 31 is displaced steeper, slip between the transmission shaft 44 and the shaft holding part 45 at the time of displacement operation decreases, and highly efficient operation can be obtained. By shifting the frequency of the switching signal to the high frequency side, the lens can be displaced fast.

If the selectable frequency band is narrow, there is a possibility that displacement of the lens holder 31 becomes difficult due to causes that the operating frequency is deviated from the selected frequency band because of variation of the characteristics of the piezo element, variation of the operating environment of the actuator or the like. On the other hand, in this embodiment, the selectable frequency band is enlarged. It is therefore possible to effectively prevent that the selected frequency is included in the resonance frequency band due to some unexpected cause.

Hereinafter, a comparative example is described with reference to FIGS. 28 and 29. Note that, in FIG. 29, operating results of an actuator are rated in the same manner as in the case of FIG. 27. It is assumed that the same circuit as in FIG. 22 is employed in the case of the comparative example as well.

Figure 28:
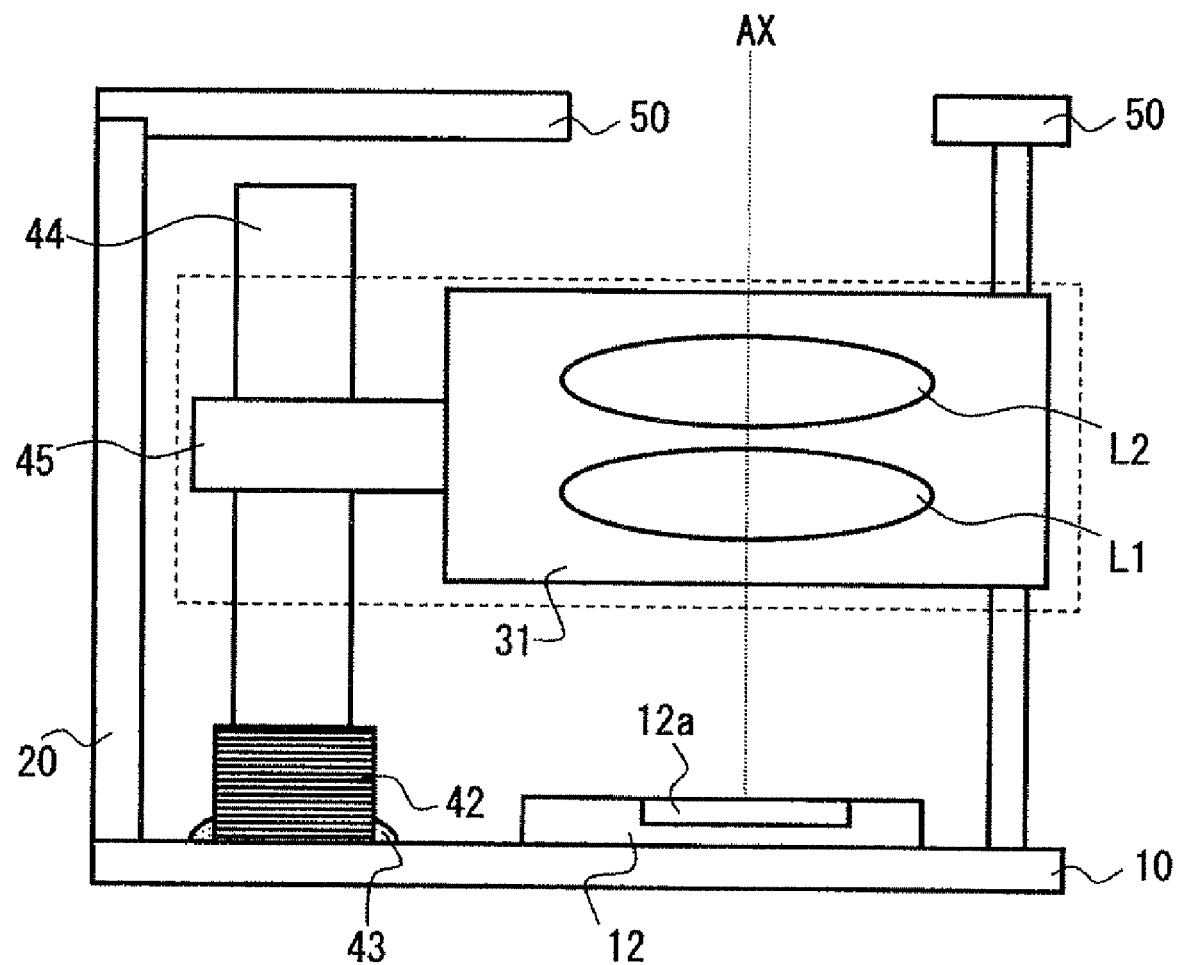
FIG. 28 is a schematic view showing a camera module according to a comparative example of the first embodiment of the present invention.

FIG. 28 shows a camera module according to the comparative example. As shown in FIG. 28, a movable part (a part surrounded by a dashed line) is composed of the lens holder 31 and the shaft holding part 45. Further, the transmission shaft 44 is fastened to the cover 50 at its upper end and not movable relative to the casing 20. The shaft holding part 45 is frictionally engaged with the transmission shaft 44.

Comparing the comparative example and the present embodiment, they are the same in the point that the piezo element PZ is driven by the sawtooth-shaped drive voltage VW1. However, they are different in the relationship between the waveform of the drive voltage VW1 and the timing of displacement of the lens holder 31. Specifically, the lens holder 31 is displaced when the waveform of the drive voltage VW1 changes in a short time in this embodiment, whereas the lens holder 31 is displaced when the waveform of the drive voltage VW1 changes slowly in the comparative example. Thus, in the case of the comparative example, it is required to secure the sufficient period during which the waveform of the drive voltage VW1 changes slowly. In this case, setting the duty ratio of the switching signal to be small makes no significance. This is because the lens holder 31 is not substantially displaced when the waveform of the drive voltage VW1 changes steeply in the case of the comparative example.

Figure 29:
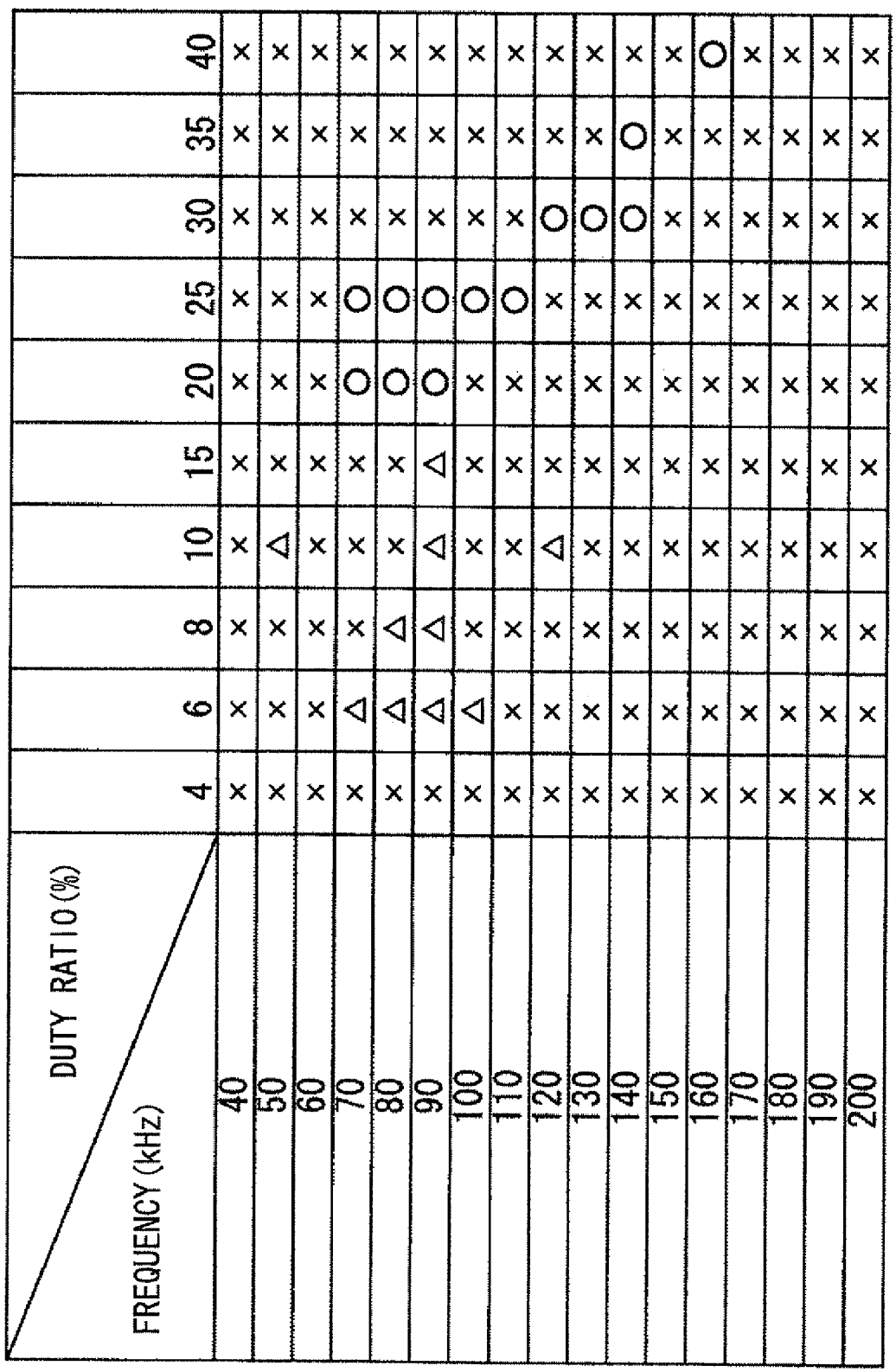
FIG. 29 is a table showing a result of evaluating an operating state of an actuator according to the comparative example of the first embodiment of the present invention.

As shown in FIG. 29, in the case of the comparative example, the selectable range of the duty ratio of the switching signal is narrow. Further, the selectable range of the frequency of the switching signal is narrow. The selectable frequency band is narrow because the transmission shaft 44 is joined to the cover 50 and resonance occurs due to the system including the casing 20.

As shown in FIG. 30, in the case of the present embodiment, compared to the case of the comparative example, the frequency band of the switching signal can be enlarged on condition that the switching signal is set to a desired duty ratio. This is because the resonance frequency is shifted to the high frequency side in the case of the present embodiment. In this embodiment, compared to the case of the comparative example, the switching signal can be set to a higher frequency. This enables faster displacement of the lens holder 31.

If the selectable frequency band is narrow, there is a possibility that displacement of the lens holder 31 becomes difficult due to causes that the operating frequency is deviated from the selected frequency band because of variation of the characteristics of the piezo element, variation of the operating environment of the actuator or the like. On the other hand, in this embodiment, the selectable frequency band is enlarged. It is therefore possible to effectively prevent that the selected frequency is included in the resonance frequency band due to some unexpected cause.

The resonance frequency depends on the shape and weight of the casing and the bonding state between the piezoelectric element and the casing. The resonance frequency differs for each product into which the drive device is incorporated in some cases. In the range where the resonance frequency exists, there is a possibility that accurate control of the actuator is difficult. Stated differently, determination as to whether the actuator functions normally or not cannot be made until the actuator is incorporated into a product. Setting error of the frequency of the switching signal can cause a decrease in product yield. According to the embodiment, it is possible to effectively prevent the occurrence of such a problem.

As is obvious from the above description, according to the embodiment, the spring $45q$ biases the press plate $45p$ in the direction (the direction along the axis line Lx2) at 90 degrees from the placement direction (the direction along the axis line Lx1) of the transmission shaft 44 viewed from the lens holder 31. Alternatively, the spring $450q$ biases the press plate $450p$ in a direction substantially parallel to the center line connecting the center of the lens holder 31 and the center of the transmission shaft 44 when viewed from above. This enables the space for placing the link member 45 (450) to be reduced effectively, thereby reducing the size of the camera module 150.

Further, in this embodiment, the lens unit 30 is attached to the casing 20 (200) through the link member 45 (450). At this time, the spring $45q$ ($450q$) is housed in the link member 45 (450). Specifically, the press plate $45p$ ($450p$) and the spring $45q$ ($450q$) are housed inside the link body $45h$ ($450h$), and they are confined from the back by the press plate $45r$ ($450r$). The transmission shaft 44 inserted through the opening of the link body $45h$ ($450h$) is thereby held tight between the link body $45h$ ($450h$) and the press plate $45p$ ($450p$). In other words, the link body $45h$ ($450h$) and the press plate $45p$ ($450p$) are in friction engagement with the transmission shaft 44. It is thereby possible to bring the transmission shaft 44 and the link member 45 (450) into friction engagement without accompanying increase in the size of the drive device.

In this embodiment, the structure is employed in which the lens holder 31, the piezo element 42 and the transmission shaft 44 are displaced together when viewed from the casing 20 (200) according to drive of the piezo element 42. In this case, the lens unit 30 is attached to the casing 20 (200) by fitting the link member 45 (450) frictionally engaged with the transmission shaft 44 into the casing 20 (200). This simplifies the assembly of the camera module 150. Further, this enables commercialization of the lens unit 30 as a single unit.

When the transmission shaft 44 is directly fixed to the lens holder 31, it is possible to position and fix them with high accuracy. It is thereby also possible to increase the accuracy of attaching the transmission shaft 44 to the lens holder 31 compared to related art.

Further, in this embodiment, in the state where the camera module 150 is assembled, the piezo element 42 is supported by the transmission shaft 44, and it is in the state of being suspended in the upper space of the casing 20 (200). In other words, the piezo element 42 does not directly abut against the casing 20 (200). It is thereby possible to eliminate a structure for fixing the piezo element 42 and reduce the size of the camera module 150. Further, this eliminates a process for fixing the piezo element 42 (a bonding process to the casing, a spindle placement process to the transmission shaft etc.).

Even when the piezo element 42 is made in the state of being suspended, the displacement of the lens holder 31 is not blocked. Generally, it is considered that, for efficient displacement of a movable object, it is necessary to mechanically fix the piezo element 42 that functions as a vibration source to another member (casing etc.) and make the transmission shaft 44 free. By the study of the inventors of the present invention, it has been found that the function of the actuator is not hindered even when the piezo element 42 is assumed to be fixed in a space by the weight of the piezo element 42 itself. Therefore, the displacement of the lens holder 31 is not blocked even when the piezo element 42 is made in the state of being suspended.

It should be noted that the present invention is not restricted to the above-described embodiment, and various changes and modifications may be made without departing from the scope of the invention. A specific structure of the biasing member is arbitrary. A method of coupling the piezo element and the transmission shaft is arbitrary, and another member may be placed therebetween. The biasing member may bias the transmission shaft indirectly through another member, rather than biasing the transmission shaft directly.

INDUSTRIAL APPLICABILITY

The drive device, the lens component and the camera module according to the present invention are used for an imaging device such as a camera, for example.

REFERENCE SIGNS LIST

10 WIRING BOARD
11 CONNECTOR
12 IMAGE PICKUP DEVICE
13 TRANSPARENT SUBSTRATE
15 REINFORCING PLATE
20 CASING
22 PARTITION, 22a, 22b RIB
24 RAIL
26a, 26b PROTRUSION
30 LENS UNIT
31 LENS HOLDER
32a, 32b SUPPORT PLATE
33 TRANSMISSION SHAFT
42 PIEZO ELEMENT
44 TRANSMISSION SHAFT
45 LINK MEMBER (SHAFT HOLDING PART)
45h LINK BODY
45h1 LOOP PART
45h2 HOUSING PART
45h2a CURVED SURFACE
45h2b TAIL PART
45h3, 45h4 PROJECTING PART
45h7, 45h8 OPENING
45p PRESS PLATE
45p3 LEFT END PART
45p4 BODY PART
45p5 RIGHT END PART
45r PRESS PLATE
50 COVER
80 CONTROLLER
81 DRIVE VOLTAGE GENERATION CIRCUIT
82 PIEZO ELEMENT
85 SWITCHING SIGNAL GENERATION CIRCUIT
90 CELLULAR PHONE
150 CAMERA MODULE
200 CASING
260a, 260b PROTRUSION
450 LINK MEMBER

450*h* LINK BODY
450*h*1 LOOP PART
450*h*2 HOUSING PART
450*h*2*a*, 450*h*2*b* TAIL PART
450*h*3, 450*h*4 PROJECTING PART
450*h*7, 450*h*8 OPENING
450*p* PRESS PLATE
450*p*3 LEFT END PART
450*p*4 BODY PART
450*p*5 RIGHT END PART
450*q* SPRING
450*r* PRESS PLATE
450*s* PROTRUDING PART
CS1, CS2 CURRENT SOURCE
L1-L3 LENS
Lx1, Lx2 AXIS LINE
OP1, OP2 OPENING
PS POWER SOURCE
PZ PIEZO ELEMENT
SW1-SW4 SWITCH
VS1-VS4 SWITCHING SIGNAL
VW1 DRIVE VOLTAGE

The invention claimed is:

1. A drive device comprising:
a couple member having a piezoelectric element and a drive shaft coupled together;
a movable object to which the couple member is fixed and that is displaced according to drive of the piezoelectric element;
a link member that includes an engagement part that is engaged with the drive shaft in a slidable manner along a lengthwise direction of the drive shaft; and
a stationary member that holds the link member, wherein
the couple member and the movable object are displaced relative to the stationary member according to the drive of the piezoelectric element, and
the link member includes a biasing member that biases the drive shaft in a direction intersecting a direction connecting a center of the movable object and the drive shaft when viewed from a moving direction of the movable object.

2. The drive device according to claim 1, wherein the link member has a shape along a periphery of the movable object.

3. The drive device according to claim 2, wherein
the stationary member includes a surrounding member that is polygonal-shaped when viewed from the moving direction of the movable object, and
the link member is placed at a corner of the surrounding member.

4. The drive device according to claim 3, wherein the direction connecting the center of the movable object and the drive shaft and a biasing direction of the drive shaft by the biasing member are in substantially orthogonal relationship to each other.

5. The drive device according to claim 2, wherein
the stationary member includes a surrounding member that is quadrangular-shaped when viewed from the moving direction of the movable object, and
an angle between the direction connecting the center of the movable object and the drive shaft and a biasing direction of the drive shaft by the biasing member is in a range of 45 to 135 degrees.

6. The drive device according to claim 1, wherein the biasing member includes an elastic body and an abutting member that abuts against the drive shaft at one end of the elastic body.

7. The drive device according to claim 6, wherein the link member, together with the abutting member, holds the drive shaft, abutting against the periphery of the drive shaft at three points.

8. The drive device according to claim 7, wherein at least the abutting member and a part of the link member abutting against the drive shaft are made of metal.

9. The drive device according to claim 8, wherein at least the abutting member and the part of the link member abutting against the drive shaft are made of metal containing aluminum alloy or zinc alloy.

10. The drive device according to claim 6, wherein the elastic body is a coil spring.

11. The drive device according to claim 6, wherein the abutting member and the link member are engaged with each other by structural fitting.

12. The drive device according to claim 6, wherein
the stationary member includes a surrounding member that is quadrangular-shaped when viewed from the moving direction of the movable object, and
an angle between the direction connecting the center of the movable object and the drive shaft and a biasing direction of the drive shaft by the biasing member is in a range of 45 to 135 degrees.

13. The drive device according to claim 6, wherein the direction connecting the center of the movable object and the drive shaft and a biasing direction of the drive shaft by the biasing member are in substantially orthogonal relationship to each other.

14. The drive device according to claim 1, wherein
the movable object includes at least two support parts that support the couple member in an immovable manner, and
the engagement part is placed between the two support parts.

15. The drive device according to claim 14, wherein a moving range of the movable object is restricted by abutting of the support parts against the engagement part.

16. The drive device according to claim 1, wherein the movable object is a lens holder that holds a lens.

17. A camera module comprising:
the device according to claim 16; and
an image pickup means that takes an image input through the lens.

18. An electronic apparatus comprising the camera module according to claim 17.

19. A drive device component comprising:
a couple member having a piezoelectric element and a drive shaft coupled together;
a movable object to which the couple member is fixed and that is displaced according to drive of the piezoelectric element; and
a link member that includes an engagement part engaged with the drive shaft in a slidable manner along a lengthwise direction of the drive shaft and has a shape along a periphery of the movable object, wherein
the couple member and the movable object are displaced relative to the link member according to the drive of the piezoelectric element, and
the link member includes a biasing member that biases the drive shaft in a direction intersecting a direction connecting a center of the movable object and the drive shaft when viewed from a moving direction of the movable object.

* * * * *